US007016011B2

(12) United States Patent
De Haan

(10) Patent No.: US 7,016,011 B2
(45) Date of Patent: Mar. 21, 2006

(54) GENERATING IMAGE DATA

(75) Inventor: Gijsbert De Haan, Montréal (CA)

(73) Assignee: Autodesk Canada Co., Montreal (CA)

( * ) Notice: Subject to any disclaimer, the term of this patent is extended or adjusted under 35 U.S.C. 154(b) by 0 days.

(21) Appl. No.: 10/403,062

(22) Filed: Mar. 31, 2003

(65) Prior Publication Data

US 2004/0090597 A1 May 13, 2004

(30) Foreign Application Priority Data

Nov. 12, 2002 (GB) .................................. 0226292

(51) Int. Cl.
*G03B 21/32* (2006.01)
*G03B 5/39* (2006.01)

(52) U.S. Cl. ........................................ 352/43; 345/581

(58) Field of Classification Search ................ 345/581, 345/629, 729, 768; 352/43
See application file for complete search history.

(56) References Cited

U.S. PATENT DOCUMENTS

| | | | | |
|---|---|---|---|---|
| 5,283,560 | A * | 2/1994 | Bartlett | 345/729 |
| 5,805,163 | A * | 9/1998 | Bagnas | 345/768 |
| 6,057,840 | A * | 5/2000 | Durrani et al. | 345/786 |
| 6,118,427 | A * | 9/2000 | Buxton et al. | 345/629 |
| 6,317,128 | B1 * | 11/2001 | Harrison et al. | 345/629 |
| 6,429,883 | B1 * | 8/2002 | Plow et al. | 345/768 |
| 6,476,816 | B1 * | 11/2002 | Deming et al. | 345/502 |

* cited by examiner

*Primary Examiner*—Rodney Fuller
(74) *Attorney, Agent, or Firm*—Gates & Cooper LLP

(57) ABSTRACT

An apparatus, method, system, and article of manufacture provide the ability to process image data in a computer system. A user-operable representation of at least one image-processing function is configured with an adjustable opacity. The user-operable representation is created and processed as a three-dimensional object. The opacity of the representation is adjusted in response to user input. The representation is ten blended with image data to generate blended image data that is output to a display.

33 Claims, 20 Drawing Sheets

```
801  [Directories]                                        802
     ProgramDir=C:\Program Files\ImageProcessingApp
     ImageDir01=\\Framestore115\C:\Project01
803  ImageDir02=\\Server112\C:\TempInternetFiles
     ImageDir03=C:\Images\Project01
     DataDir01=\\Framestore115\C:\Project01
804  DataDir02=\\Server112\C:\TempInternetFiles
     DataDir03=C:\Data\Project01

805  [System]
     Language = English  806
     SetDevice = Mouse.dll
     SetDevice = Keyboard.dll
807  SetDevice = Tablet.dll
     SetDevice = QUADRO4.dll
808  Autosave = 1
     AutosaveTime [01:00]  809

810  [Desktop]
     Display = XGA  811
812  LoadImage = UIweight [0.5]0      //Enter 1 to load last image on startup
     LoadUI = 1  814
815  UIweight [0.5]          //Enter value between 0.0 and 1.0
813  Imageweight [0.5]       //Enter value between 0.0 and 1.0

     [ModuleCompatibility]
     ...
```

```
...                          902                        901
OnEvent [System] : GetDevicePos (X,Y);
    Fn(Map) (X,Y) : MapEvent [UI]; ~904
        If Fn(Map) = TRUE; ~905
903     CurrentWidget : Void(Main) ~906
        ElseIf Fn(Map) = FALSE; ~908
909~Fn(ParseUITree) : Fn(Map) (X,Y);   //Try Next Widget
    EndFn(Map) ~907
Next
...
```

```
[...]  1001        1002
int CObj_(UIcontainer);
int data (widget_n); ~1003
[...]        1005          1004
    gl_Enable (GL_BLEND);
    gl_Blend (Func) (GL_SRC_ALPHA;
                      GL_ONE; ~1006
                      GL_ONE_MINUS_SRC_ALPHA);
    gl_Color (0; 0; 0; ALPHA); ~1007
    gl_Rect (x1; y1; x2; y2); ~1008
DrawObj_(UIcontainer); ~1009
[...]
~CObj_(UIcontainer); ~1010
```

*Figure 10*

GENERATING IMAGE DATA

CROSS-REFERENCE TO RELATED APPLICATIONS

This application claims the benefit under 35 U.S.C. §119 of the following co-pending and commonly-assigned patent application, which is incorporated by reference herein:

United Kingdom Patent Application Number 02 26 292.1, filed on Nov. 12, 2002, by Gijsbert de Haan, entitled "GENERATING IMAGE DATA".

BACKGROUND OF THE INVENTION

1. Field of the Invention

The present invention relates to improving image data processing in image data processing systems.

2. Description of the Related Art

Image frames of motion pictures or video productions are traditionally captured on stock film and subsequently digitised for image editing professionals to edit such frames in post-production, for instance to blend computer-generated special effects image data therein, a function known to those skilled in the art as compositing. Modern developments in image capture technology have yielded advanced film stock, such as the well known 65 millimetres IMAX film, and digital cameras, wherein image frames captured by either have higher resolutions, thus capable of depicting their content with much more detail over a larger projection support.

Digitally-generated or digitised image frames have a resolution, or definition, expressed in picture screen elements also known as pixels, whereby said resolution amounts to the area defined by the height and width in pixels of such frames. For instance, motion picture frames exposed on 65 millimetres film stock comprise about 2048×1536 pixels once digitised for post-production purposes. Comparatively, video frames exposed on Super 16 millimetres film stock comprise about 1920 by 1080 pixels once digitised to the known 1080p High-Definition TV (HDTV) standard for broadcast.

Known image processing systems, such as Silicon Graphics Fuel™ or Octane2™ workstations manufactured by Silicon Graphics Inc of Mountain View, Calif., USA may be used to process both types of digitised frames respectively before the final theatre release or the broadcast thereof, and are typically limited to an optimum frame display size of about 1920×1200 pixels.

When considering the respective costs of image editors as highly skilled operatives and of image processing systems configured with image processing applications, which are non-trivial, trade-off situations are inevitable in that said systems may display said frames at higher resolutions than the original, but at the cost of decreasing both the rate of frame display and the data processing capacity of said workstations, thus slowing the output in terms of image data processed per unit of editing time of an image editing professional using such a system. Conversely, said systems may display said frames at lower resolutions than the original, but at the cost of decreasing the amount of detail observable by the image editor in the image frame, thus potentially introducing undesirable artefacts in said output. It is therefore desirable for the image editor to work with full-resolution image frames whenever possible.

However, image editing professionals using said image processing systems traditionally invoke the image data processing functions thereof by means of function-specific user-operable menus, known to those skilled in the art as widgets, within the graphical user interface (GUI) of an image processing application, which must also be displayed onto said VDU such that said professionals may accurately select the function appropriate for the task at hand. In this framework, comparing the increasing resolution of the above high-definition image frames with the maximum display resolution offered by current image processing systems highlights a growing problem, in that said GUI itself requires a substantial amount of the image frame displayable by said systems, whereby the portion of displayable image frame taken by said GUI is at the expense of the portion of displayable full-resolution image frame to be worked upon.

BRIEF SUMMARY OF THE INVENTION

According to an aspect of the present invention, there is provided an apparatus for processing image data comprising storage means, processing means, manually operable input means and display means, wherein said storage means are configured to store said image data and instructions and said processing means are configured by said instructions to perform the steps of configuring at least one user-operable representation of at least one image-processing function defined by said instructions with an adjustable opacity; adjusting said opacity of said representation in response to user input received from said manually operable input means; blending said representation and said image data to generate blended image data and outputting said blended image data to said display means.

According to another aspect of the present invention, there is provided a method of processing image data with at least one image processing function comprising image data stored in storage means, processing means, manually operable input means and display means, wherein said method comprises the steps of configuring at least one user-operable representation of said image-processing function with an adjustable opacity; adjusting said opacity of said representation in response to user input received from said manually operable input means; blending said representation and said image data to generate blended image data and outputting said blended image data to said display means.

BRIEF DESCRIPTION OF THE SEVERAL VIEWS OF THE DRAWINGS

FIG. 8 shows an example of a configuration file shown in FIG. 7, including a graphical user interface (GUI) configuration;

FIG. 9 shows an example of the application shown in FIG. 7, shown in pseudo-code form before compilation and including instructions to receive user-input;

FIG. 10 provides an example of the microcode shown in FIG. 7, shown in pseudo-code form before compilation and processing thereof and including instructions to process a GUI tree according to user-input;

WRITTEN DESCRIPTION OF THE BEST MODE FOR CARRYING OUT THE INVENTION

The invention will now be described by way of example only with reference to the previously identified drawings.

FIG. 1

Figure 1:
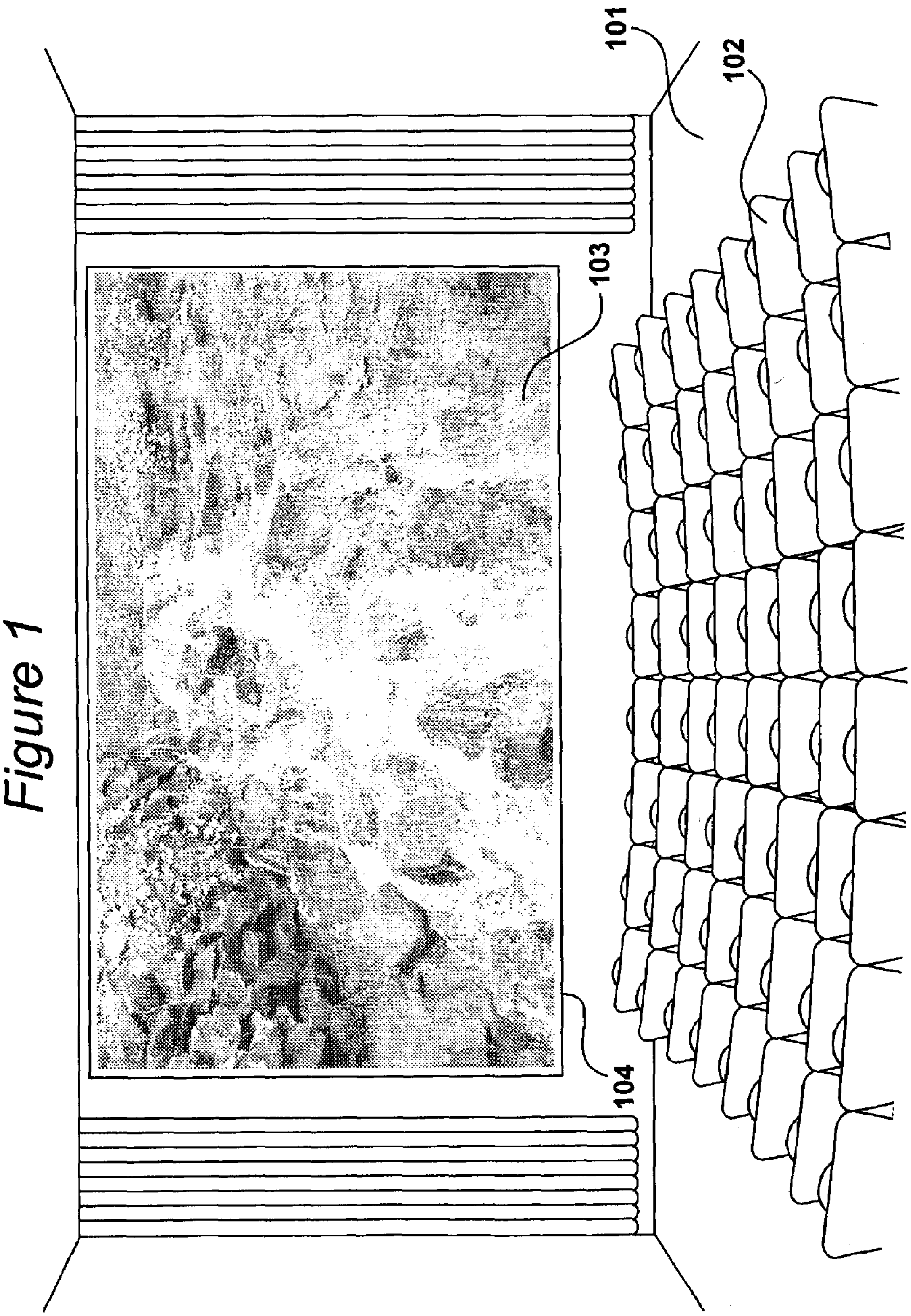
FIG. 1 illustrates an image frame projected onto a movie screen to an audience.

A conventional movie theater 101 is shown in FIG. 1, in which an audience 102 is watching a scene 103 projected onto a movie screen 104. Scene 103 comprises a sequence of many thousands of image frames exposed on conventional 65 mm film stock, thus having a very high resolution necessary to realistically portrait the contents thereof when magnified by the projector onto screen 104, having regard to the amount of detail observable by audience 102 therein.

As was detailed in the introduction above, it is known to digitise each image frame of sequence 103 for the purpose of post-production editing and the implementation of image enhancements. In order to facilitate said editing and enhancements, various image data processing techniques have been developed to improve the interaction of an image editor therewith, and the workflow thereof. Specifically, one such technique involves the referencing of said digitised image frames and the various post-production processes applied thereto within a hierarchical data processing structure, also known as a process tree, whereby said image editor may intuitively and very precisely edit any component or object of any digitised image frame referenced therein.

FIG. 2

Figure 2:
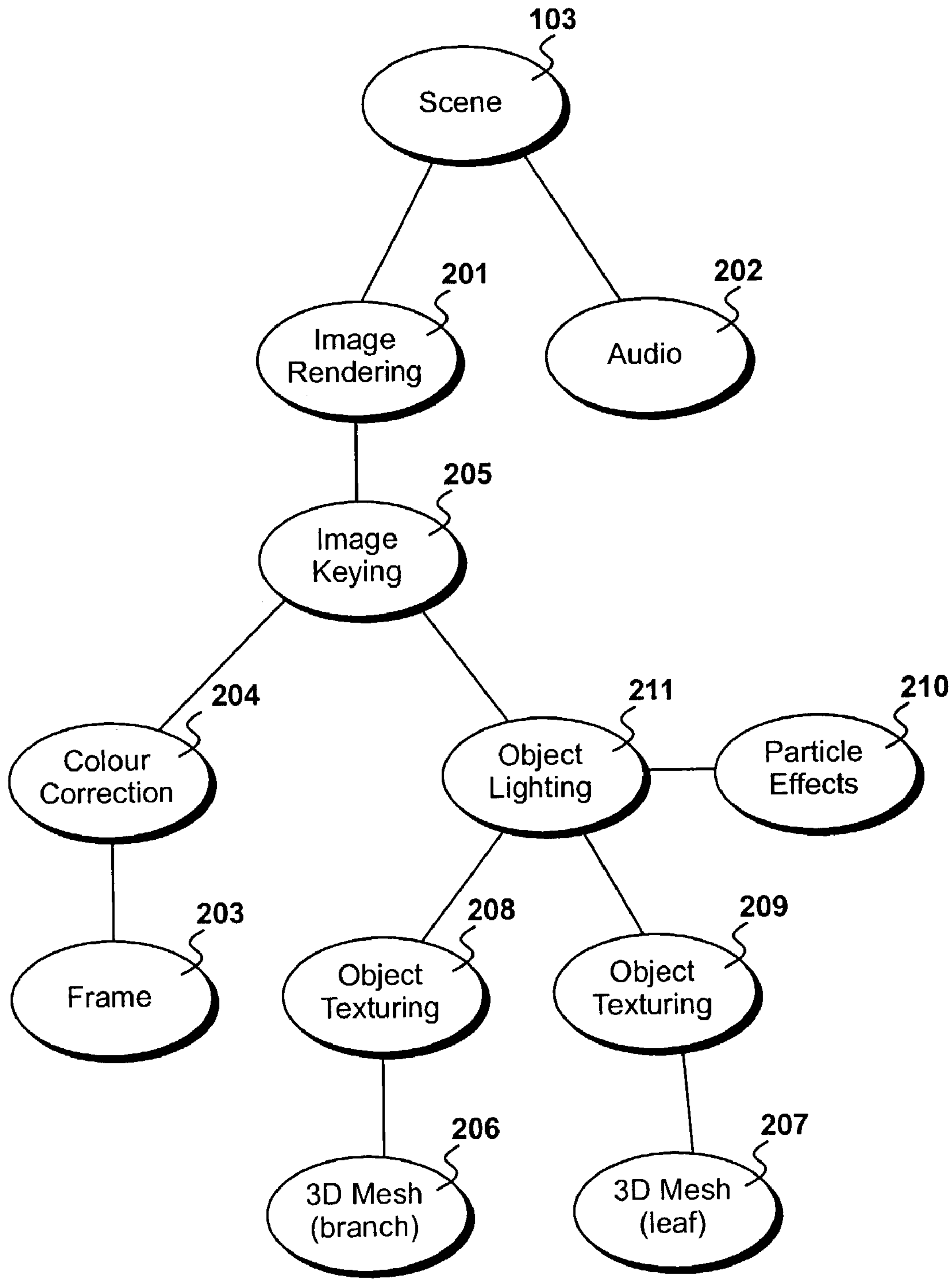
FIG. 2 details a hierarchical structure defining the image frame shown in FIG. 1 to be edited and/or processed by an image processing system.

A simplified example of the process tree of sequence 103 is shown in FIG. 2. Process trees generally consist of sequentially-linked processing nodes, each of which specifies a particular processing task required in order to eventually achieve an output in the form of a composited frame or a sequence of a plurality thereof, in the example sequence 103. Traditionally, the output sequence 103 will comprise both image data and audio data. Accordingly, the composited scene 103 will thus require the output from an image-rendering node 201 and the output of a sound-mixing node 202. The image-rendering node 201 calls on a plurality of further processing nodes to obtain all of the input data it requires to generate the output image data, or sequence of composited frames. In the example, the desired output image data 103 includes a plurality of frames within which three-dimensional computer-generated objects are composited into a background portraying a water cascade.

The image rendering node 201 thus initially requires a sequence of frames 203, which are digitised 65 mm film frames portraying said water cascade. In the example still, each such digitised frame is subsequently processed by a colour correction processing node 204, for instance to optimise the various levels of brightness, contrast, hue and saturation with which the red, green and blue colour components defining each pixel of said digitised frames are configured.

In the example, the task of the image editor is to implement foliage, understood as branches having leaves, in and around said water cascade, but which were absent from the original location committed to film. Consequently, said foliage has to be created and seamlessly incorporated into each "water cascade" frame. Within the process tree, image rendering note 201 thus requires an image-keying node 205 to key the colour-corrected (204) frame sequence 203 with said artificial foliage. Thus, said image keying node 205 requires the respective outputs of a first three-dimensional object-generating node 206, the task of which is to output branches as meshes of polygons and of second three-dimensional object-generating node 207, the task of which is to generate leaves as meshes of polygons.

Preferably, a "wood" texture is applied by a first object-texturing node 208 to the "branch" meshes generated by node 206 and a "leaf" texture is applied by a second object-texturing node 209 to the "leaf" object meshes generated by node 207. A particle effects-generating node 210 then generates artificial, realistic water spray to be super imposed over the above three-dimensional, textured objects in order to enhance the realism of the final output 103, e.g the impression conveyed to audience 102 that the above foliage generated by nodes 206 to 209 was committed to film at the same time as the water cascade. A final object-lighting processing node 211 collates the output data of nodes 206 to 210 in order to further accentuate said realism of said output scene 103 by artificially lighting said computer-generated foliage and water spray, preferably according to location light parameters obtained at the time of filming the water cascade or, alternatively, by means of light maps which are well known to those skilled in the art.

Upon receiving the output of nodes 204 and 211, image keying 205 can subsequently key the colour-corrected frames 203 with the lit and textured three-dimensional objects using conventional image keying processes, such as for instance chroma-keying or lutna-keying, whereby the output of said image keying node 205 is provided to image-rendering 201 for outputting final, composited sequence 103.

FIG. 3

Figure 3:
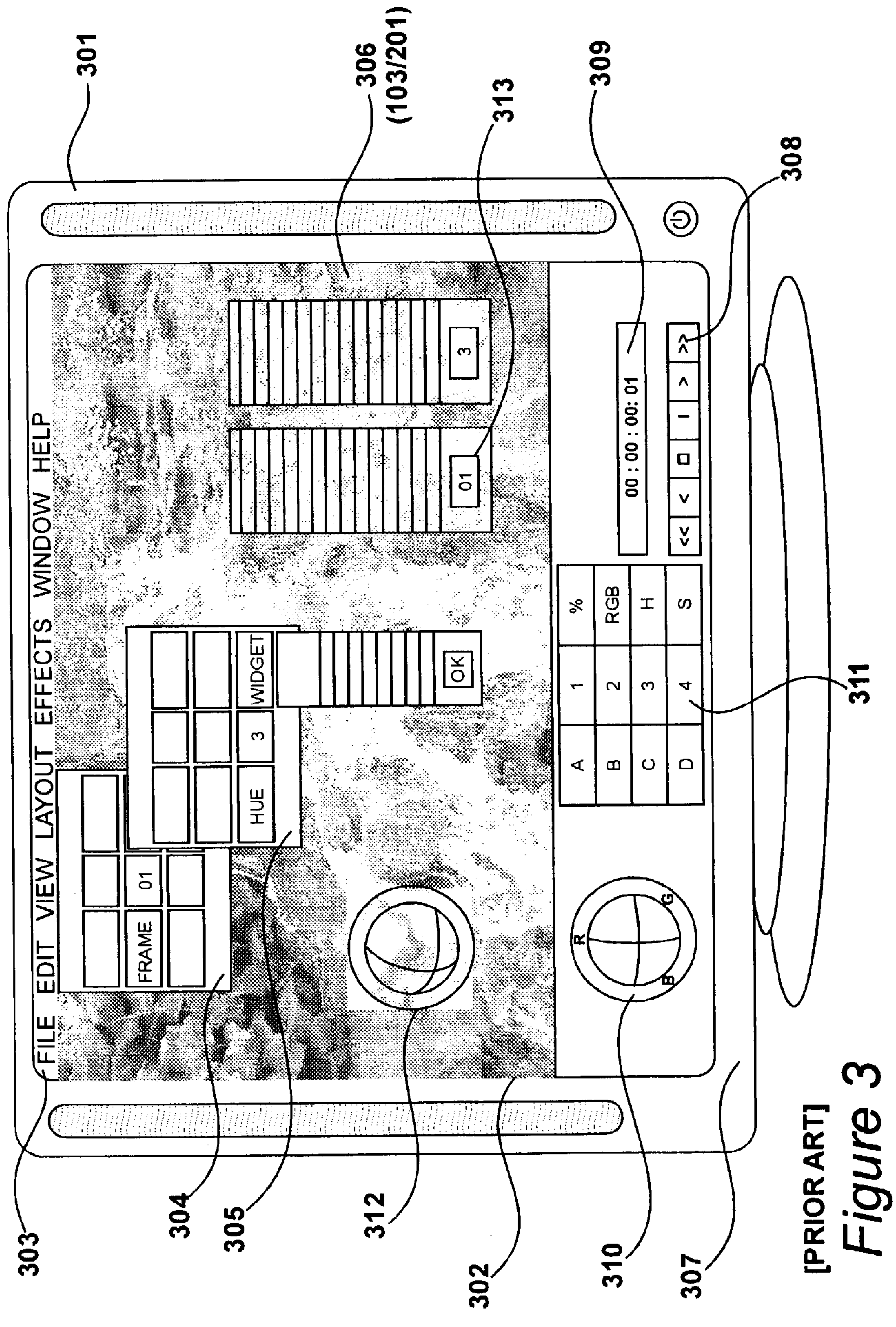
FIG. 3 shows the graphical user interface of an image processing application according to the known prior art, used to edit and process the structure shown in FIG. 2.

Each data processing node 201 to 211 may be edited by an image editor with using an image processing application processed by an image processing system, an example of which will be described further below in the present description. Image processing applications traditionally provide for the above-described intuitive interaction therewith by an image editor by means of outputting a graphical user interface (GUI) to display means, within which representations of image-processing functions are displayed for selection and are alternatively named menus, icons and/or widgets by those skilled in the art. The VDU 301 of an image processing system configured by an image processing application according to the known prior art for outputting a GUI 302 and the output of image-rendering node 201 is shown in FIG. 3.

Said GUI 302 predominantly features a menu bar 303, configured with user-operable "function selection zones" having generic function-grouping names thereon such as "file", "edit", "view" and so on. Upon selecting any of said selection zones, its respective "pull-down" menu 304 will be generated and displayed at a position in relation to said selection zone and may itself feature further such "function selection zones", whereby further "pull-down" sub-menus 305 may be generated then displayed at similarly selection zone-related positions and so on and so forth, in accordance with the well known "nested menus" design practice. With reference to the digitised image frame currently displayed within GUI 302 in frame display area 306, iteratively selecting image data-processing functions within menus and sub-menus 304, 305 involves super-imposing said menus or sub-menus over the frame display area 306, whereby a non-trivial portion of area 306 becomes more and more obstructed during function selection.

In addition to menu bar 303, some GUIs according to the known prior art also feature "widget interaction zones", such as GUI area 307, within which a plurality of image data-processing functions may be represented by user-operable, interactive, specialist interfaces. Such specialist interfaces may for instance be conventional, frame sequence-navigation widgets 308 allowing an image editor to rewind, backward play, pause, stop, forward play or fast forward the sequential order of image frames within sequence 103. A non-operable counter 309 is traditionally provided in close proximately to widgets 308 and divided into an hour counter, minute counter, seconds counter and frame counter, to enable an image editor to accurately determine where the currently displayed frame in display area 306 is located within the complete sequence 103.

In more modern image processing applications GUIs, user-operable colour-suppression widgets 310 are also provided, the interaction with which by an image editor provides the image processing application with user input data such as hue and saturation levels with which to process the red, green and blue colour components of all the pixels of the image frame displayed in area 306 or a portion thereof, or even of all the image frames within the entire sequence 103. Preferably, the area 307 also includes a "parameters display zone" 311, the purpose of which is to provide feedback in alphanumerical form to the image editor when interactively operating the aforementioned widgets.

In yet more recent image-processing application GUIs, said user-operable widgets, for instance the above colour-suppression widget 310, are configured with a level of transparency. Such a transparent widget 312 may be "overlayed" by the image-processing application on top of the display area 306 and allow the image editor to interact therewith whilst viewing the portion of image frame that would otherwise be "hidden" behind it. It is known even to configure the above menus 304, 305 with such transparency, shown at 313. However, the above transparent configuration according to the known prior art is very processor-intensive, because most elements of a user interface, be they widgets or icons and whether interactive or passive, are two-dimensional bitmaps, thus graphic data structures that a central processing unit (CPU) takes a comparatively large amount of time to process for display. Moreover, even when said CPU sends such graphic data to a specialist hardware graphics processor, colloquially known as a "graphics accelerator", to take over the processing burden, such bitmap graphic data structures are not optimally-processed therein because such graphics processors are optimised for processing three-dimensional graphics data.

The present invention overcomes these limitations by providing a user interface configured with a level of transparency, wherein said user interface is generated by processing three-dimensional graphical data, which may be understood as both image data and frame data.

FIG. 4

Figure 4:
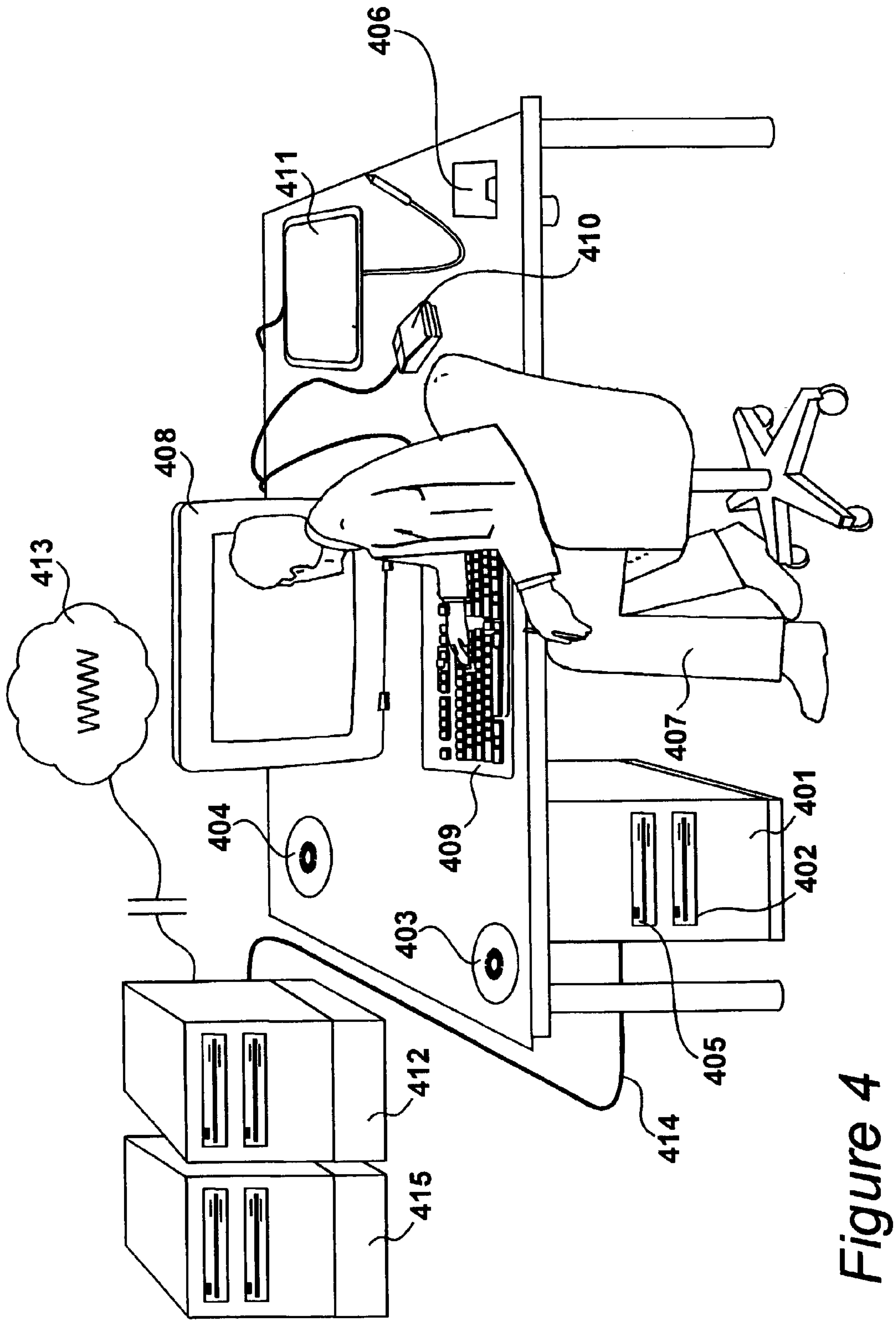
FIG. 4 shows an image processing system operated by an artist, which comprises an inexpensive computer system.

An image data processing system is shown in FIG. 4 and includes a programmable computer 401 having an optical drive 402 for reading data encoded in a DVD-ROM or CD-ROM 403 and writing data to a CD-RAM or DVD-RAM 404, and a magnetic drive 405 for reading data from and writing data to high-capacity magnetic disks, such as a ZIP™ disk 406. According to the invention, computer 401 may receive program instructions or image data via an appropriate DVD-ROM or CD-ROM 403 or said ZIP™ disk 406, and image data may be similarly written to a re-writable DVD-RAM or CD-RAM 404 or ZIP™ disk 406 after the editing and processing thereof according to said instructions.

Image processing system 401 is operated by artist 407, who may visualise the output data thereof on a visual display unit 408 and the manual input of whom is received via a keyboard 409 and a mouse 410. In the preferred embodiment of the present invention, the image data processing system 401 also include stylus-and-tablet input means 411.

In addition to local data reading and writing means 402, 405, computer 401 may also exchange instructions and/or image data with a network server 412 or the internet 413, to which said server 412 provides access, by means of network connection 414. In the preferred embodiment of the present invention, network connection 414 also provides Sage processing system 401 with connectivity to a framestore 415, which specifically stores image data in the form of digitised image frames, whereby image processing system 401 may receive said image frames from framestore 415, artist 407 may perform local editing of said image frames at system 401 and subsequently store said edited image frames back onto said framestore 415.

FIG. 5

Figure 5:
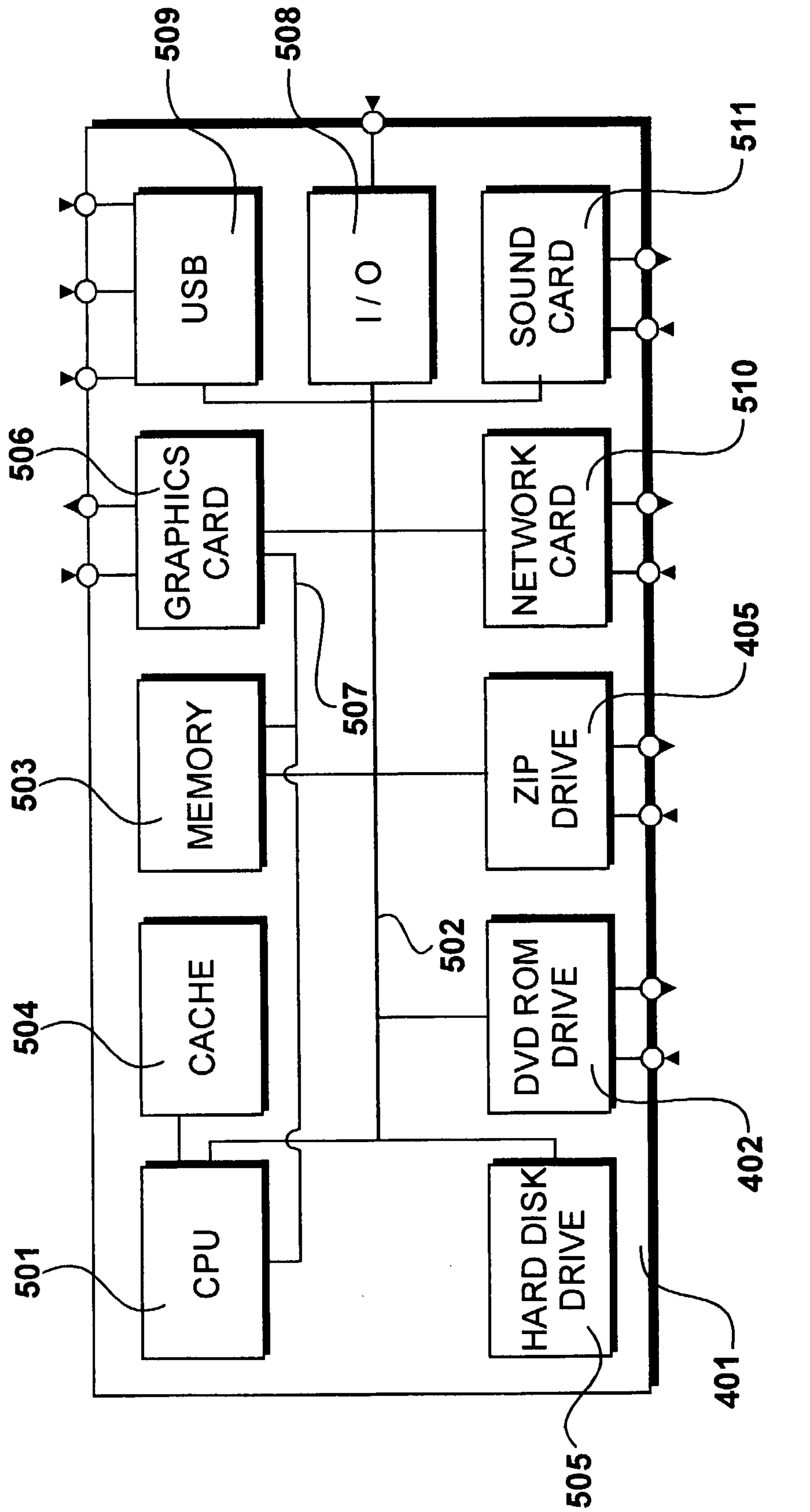
FIG. 5 provides a representation of a typical internal architecture of the computer system shown in FIG. 4, including a graphics accelerator card and a memory.
Figure 6:
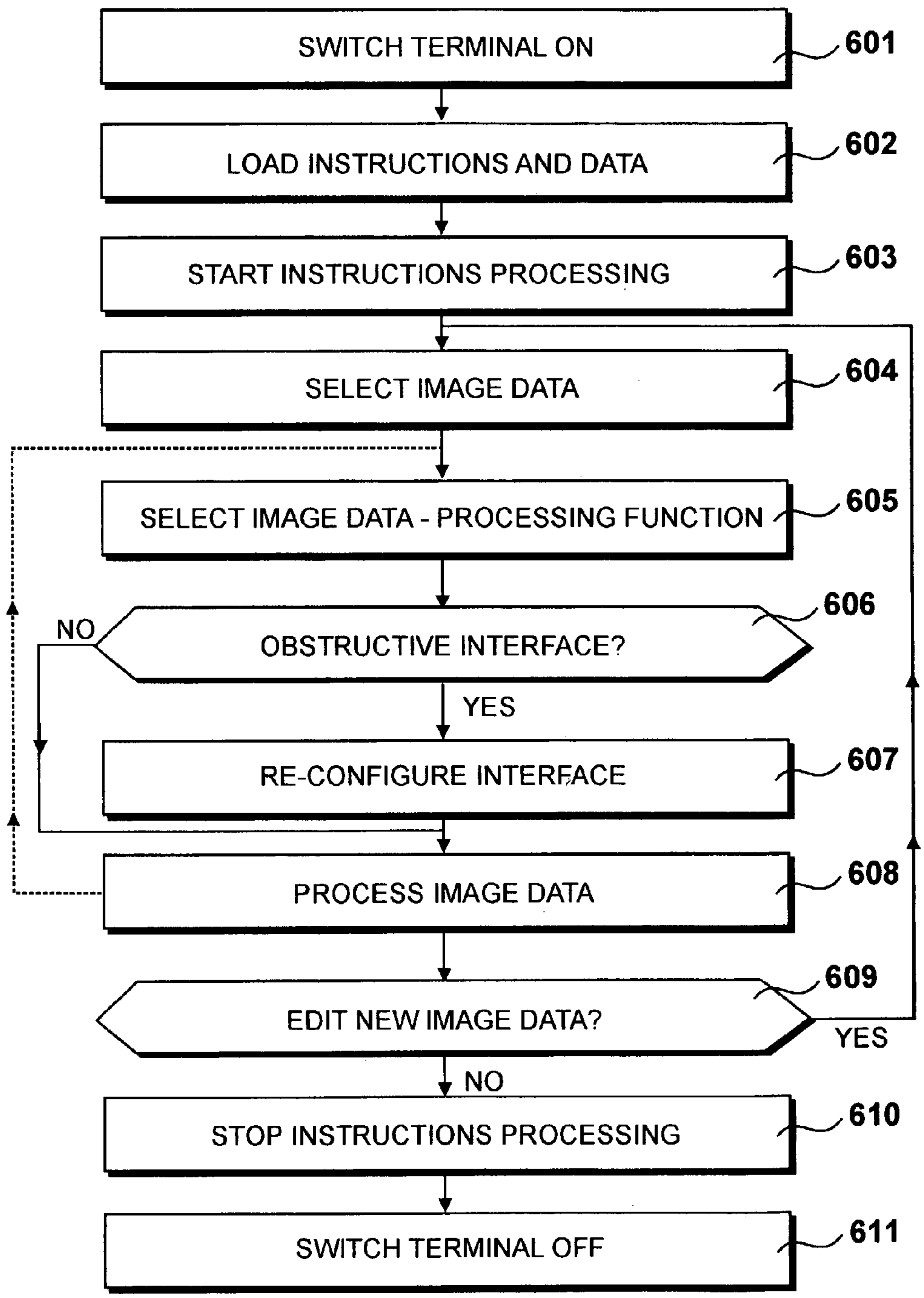
FIG. 6 details the operational steps according to which the artist shown in FIG. 4 operates the image processing system according to the present invention.

The components of computer system 401 are further detailed in FIG. 5. The system includes a Pentium 4™ central processing unit (CPU) 501 which fetches and executes instructions and manipulates data via a system bus 502 providing connectivity with a larger main memory 503, optical medium drive/writer 402, magnetic medium drive 405 and other components which will be further detailed below. System bus 502 is, for instance, a crossbar switch or other such bus connectivity logic.

CPU 501 is configured with a high-speed cache 504 comprising between two hundred and fifty-six and five hundred and twelve kilobytes, which stores frequently-accessed instructions and data to reduce fetching operations from larger memory 503. Memory 503 comprises between two hundred and fifty-six megabytes and one gigabyte of dynamic randomly accessible memory and stores executable programs which, along with data, are received via said bus 502 from a hard disk drive 505. Hard disc drive (HDD) 505 provides non-volatile bulk storage of instructions and data.

A graphics card 506 receives graphics data from the CPU 501, along with graphics instructions. Said graphics card 506 is preferably coupled to the CPU 501 by means of a direct port 507, such as the advanced graphics port (AGP) promulgated by Intel Corporation, the bandwidth of which exceeds the bandwidth of bus 502. Preferably, the graphics card 506 includes substantial dedicated graphical processing capabilities, so that the CPU 501 is not burdened with computationally intensive tasks for which it is not optimised. In the example, graphics card 506 is a Quadro4 900XGL accelerator card manufactured by the Nvidia Corporation of Santa Clara, Calif.

Input/output interface 508 provides standard connectivity to peripherals such as keyboard 409, mouse 410 or graphic tablet-and-stylus 411. A Universal Serial Bus (USB) 509 is provided as an alternative means of providing connectivity to peripherals such as keyboard 409, mouse 410 or said graphic tablet-and-stylus 411, whereby said connectivity is improved with a faster bandwidth for user input data transfer.

Network card 510 provides connectivity to server 412, the internet 413 and framestore 415 by processing a plurality of communication protocols. Optionally, a sound card 511 is provided which receives sound data from the CPU 501 over system bus 502, along with sound processing instructions, in a manner similar to graphics card 506. Preferably, the sound card 512 includes substantial dedicated digital sound processing capabilities, so that the CPU 501 is not burdened with computationally intensive tasks for which it is not optimised.

The equipment shown in FIG. 5 constitutes an inexpensive programmable computer of fairly standard type, such as a programmable computer known to those skilled in the art as an IBM™ PC compatible or an Apple™ Mac.

FIG. 6

At step 601, the computer system 401 is switched on, whereby all instructions and data sets necessary to process image data are loaded at step 602 from HDD 505, optical medium 403, magnetic medium 406, server 412 or the internet 413, including instructions according to the present invention. Upon completing the loading operation of step 602, the processing of said instructions according to the present invention by CPU 501 starts at step 603.

At step 604, image data from a single image frame 10 or, alternatively, from a clip of image frames is acquired from HDD 505, optical medium 403, magnetic medium 406, server 412, the internet 413 or frame store 415 such that it can be displayed to artist 407 on VDU 408 for subsequent editing. Said image data is for instance acquired as a scene 103 shown in FIGS. 1 and 2 comprising a plurality of scene objects 201 to 211.

At step 605, user 407 selects a particular image data processing function with which to process the image data selected at step 604, in relation to the required task at hand. For instance, the 'foliage' scene object 207 of scene 103 may have a natural, dull green colour, but user 407 requires said colour to appear brighter and greener, whereby a colour-correction function 204 is selected at said step 605. At step 606, a representation of said colour-correction function is first output to display 408, in order to allow user 407 to intuitively input the required parameters with which said function will process the data defining object 207 to render it brighter and greener, whereby a question is asked as to whether said representation obstructs user 407 view of the image data loaded and output at step 604.

If the question of step 606 is answered positively, user 407 may then reconfigure said representation according to the present invention with a level of opacity to confer a degree of transparency to it at step 607, whereby all of the image data loaded and output at step 604 can be viewed whilst intuitively inputting the required parameters with which said function selected at step 605 will process the data defining object 20 to render it brighter and greener. Alternatively, the question of step 606 is answered negatively, whereby reconfiguration is not required and control is directed to the next editing step 608.

Said editing step 608 thus comprises editing the data and/or parameters of any or all of said scene objects 201 to 211 of said scene 103. Upon completing the editing step 608, a question is asked at step 609 as to whether another image frame or another clip of image frames, i.e. another scene, requires processing by image processing system 501 according to the present invention. If the question of step 608 is answered positively, control is returned to step 604 such that new image data can be acquired from HDD 505, optical medium 403, magnetic medium 406, server 412, the internet 413 or frame store 415. Alternatively, if the question asked at step 608 is answered negatively, then artist 407 is at liberty to stop the processing of the instructions according to the present invention at step 610 and, eventually, switch image processing system 501 off at step 611.

FIG. 7

The contents of main memory 503 subsequently to the selection step 604 of a scene are further detailed in FIG. 7.

An operating system is shown at 701 which comprises a reduced set of instructions for CPU 501, the purpose of which is to provide image processing system 401 with basic functionality. Examples of basic functions include for instance access to files stored on hard disk drive 505 or DVD/CD ROM 403 or ZIP™ disk 406 and management thereof, network connectivity with network server 412, the Internet 413 and frame store 415, interpretation and processing of the input from keyboard 409, mouse 410 or graphic tablet 411. In the example, the operating system is Windows XP™ provided by the Microsoft corporation of Redmond, Calif., but it will be apparent to those skilled in the art that the instructions according to the present invention may be easily adapted to function under different other known operating systems, such as IRIX™ provided by Silicon Graphics Inc or LINUX, which is freely distributed.

An application is shown at 702 which comprises the instructions loaded at step 602 that enable the image processing system 501 to perform steps 604 to 610 according to the invention within a specific graphical user interface displayed on video 408. Application data is shown at 703 and 704 and comprises various sets of user input-dependent data and user input-independent data according to which the application shown at 702 processes image data. Said application data primarily includes a data structure 703, which references the entire processing history of the image data as loaded at step 604, e.g. scene 103, and will hereinafter be referred to as a scene structure. According to the present invention, scene structure 703 includes a scene hierarchy which comprehensively defines the dependencies between each component within an image frame as hierarchically-structured data processing nodes, as described in FIG. 2.

Further to the scene structure 703, application data also includes scene data 704 to be processed according to the above hierarchy 703 in order to generate one or a plurality of image frames, i.e. the parameters and data which, when processed by their respective data processing nodes 201 to 211, generate the various components of said image frame. In the example, scene data 704 comprises image frame 203 digitised from film and subsequently stored in frame store 415.

User input data is shown at 705, which comprises user input-dependent data identifying parameters and/or data input by artist 407 by means of keyboard 409, mouse 410 and/or graphic tablet 411 to edit scene structure and data 703, 704 at steps 607 and 609. Instructions of the application 702 according to the present invention may include a configuration data structure 706 processed by CPU 501 to initialise the application in its default state at step 603, a main executable set of instructions 707 configuring said CPU 501 for processing image data itself and one or a plurality of plug-ins 708 representing specialist image data-processing functions that may be loaded and unloaded within application 702 dynamically. Said set 702 of instructions is processed by the image processing system 401 to display image data on the video display unit 408, wherein the CPU 501 may transfer graphics data and instructions to and from the graphics card 506. Said instructions preferably conform to an application programmer interface (API) such as OpenGL which, when processed by CPU 501, generates said information as microcode 709. In effect, said microcode 709 comprises processor commands and both two- and three-dimensional graphical data, in the example two-dimensional user interface data 710, two-dimensional scene data 711 and three-dimensional scene data 712. CPU 501 transfers these commands and data to memory 503 and/or cache 504. Thereafter, CPU 501 operates to transfer said commands data to the graphics card 506 over the bus 507.

FIG. 8

An example of a configuration file, such as configuration file 706, is shown in further detail in FIG. 8, including configuration data. It will readily understandable by those skilled in the art that said configuration file is shown edited for the purpose of clarity, and the application-configuring parameters described therein do not purport to be exhaustive or limitative, but representative.

The configuration data stored in configuration file 706 is parsed by CPU 501 at step 603 in order to initialise the application 702 and the GUI thereof, wherein said configuration data defines default parameters according to which said application 702 accesses and processes image data, such as sequence 103. In a preferred embodiment of the present invention, user 407 may edit said default parameters in said configuration file in order to initialise the application 702 and the GUI thereof according to his or her preferences.

Although the operating system 701 allows user 407 to access and manage datasets stored locally such as application 702 or image data stored in HDD 505, or remotely such as image sequence 103 stored in framestore 415, application 702 nevertheless requires initial configuration parameters 801 defining the various locations, understood as datasets storage location, from which data sets may be accessed by said application 702 and to which edited data sets may be written to, whereby said locating parameters define dataset access paths. Examples of such paths may therefore include a path 802 defining where CPU 501 should access application 702 for the processing thereof and then a plurality of paths 803 defining where application 702 should access RGB image data such as image frames and a plurality of paths 804 defining where application 702 should access corresponding data processing structures, such as described in FIG. 2.

Similarly, although the operating system 701 defines most of the operating parameters of image processing system 401 upon starting up, for instance in terms of recognising and configuring connected devices such as keyboard 409, mouse 410 and tablet 411 so as to read and process the input thereof, and recognising and configuring internal devices such as graphics card 506 or sound card 511 so as to output processed image or audio data thereto for further processing therein, application 702 nevertheless requires initial configuration parameters 805 defining input and/or output data-processing parameters specific to said application, for instance if application 702 requires a connected and/or internal device to process data in a different mode than initiated by OS 701. Examples of such application-specific, operating parameters 805 may therefore include a language setting 806, e.g. if the user 407 wishes to operate a French or German GUI, and device driver designations 807. Said application-specific, operating parameters 805 may also include bit-based processing function activators, known as flags to those skilled in the art: data-processing functions are enabled with a "one"setting or disabled with a "zero"setting, and are particularly suited to automated and/or cyclical functions such as an 'autosave' function 808, the purpose of which is to write any data being processed to its path-designated storage location at regular intervals 809, thus sparing user 407 the time and need to interrupt his or her workflow to accomplish this writing operation manually.

Upon defining the location of processing functions and data and, further, application-specific operating parameters, application 702 next requires configuration parameters 810 defining the application graphical user interface in its initial state, e.g the data output to VDU 408 under the form of a visual environment within which representations of image data processing functions and the image data itself will be displayed. Examples of such interface configuration parameters 810 may therefore specify a display resolution 811, which may differ substantially from the standard resolution of the OS 701, e.g a much higher number of displayed pixels to accommodate high-resolution image frames. Other examples may include a flag 812 specifying the automatic fetching of the last image data to be processed before the application was last terminated and a respective user-modifyable opacity parameter 813. According to the present invention, a flag 814 specifying the automatic processing of the standard User Interface object according to a user-modifiable opacity parameter 815 are both provided, which will be further described below.

Application 702 may require a plurality of further configuration parameters, potentially hundreds depending upon the complexity of said application in terms of the number of data processing functions therein, and it will be understood by those skilled in the art that the configuration file shown in FIG. 8 is by way of example only.

FIG. 9

Upon CPU 501 completing the parsing of the configuration file 706 to start and initialise application 702, application 702 may now read and process user input data according to a set of data processing rules. Said data processing rules or code are compiled into binary form processable by CPU 501, but are shown as uncompiled, edited pseudo-code in FIG. 9 for the purpose of clarity.

The pseudo-code shown in FIG. 9 declares rules according to which user-input data read from keyboard 409, mouse 410 and/or tablet 411 is processed by application 702 to effect a processing function represented within the user interface. In effect, this code declares how application 702 should process input two-dimensional (X, Y) motion data 901 corresponding to the planar movements of mouse 410 or the location of the stylus relative to the tablet 411 and/or binary 'on/off' data 902 corresponding to the activation of a key of keyboard 409, a button of said mouse 410 or the 'impact' of said stylus on said tablet 411.

Said input data processing is a mapping function 903 by which application 702 correlates the screen location 901 of a cursor constantly referencing the relative position of said mouse or stylus within the user interface, with the representation 904 of a particular processing function designated therewith within said user interface, in real-time. According to the preferred embodiment of the present invention, said user interface is a structure of hierarchical nodes and data, which will be described further below in the present description, but each of which is a representation of a user-operable processing function, configured with a two-dimensional (X, Y) screen position when output to said user interface.

Thus, upon user 407 effecting a function or menu selection and/or interaction within the user interface by means of keyboard 409, mouse 410 and/or tablet 411, function 903 attempts to map said input data to the first function in said structure of hierarchical nodes, whereby if successful at 905, said first function is called at 906 and the mapping function is reset at 907. Alternatively, failure to map said first function at 908 results in attempting to map said input data to the next function in said structure at 909 and so on and so forth until such time as the mapping function is eventually successful at 905.

FIG. 10

The user interface of the application according to the present invention is configured with a variable, user-configurable degree of opacity, whereby the structure and data therein defining said user interface are processed by application 702 to generate microcode defining said GUI as a three-dimensional object, comparable to the afore-mentioned foliage 206 to 209, which may thus be further processed by graphics card 506. Graphic data processing functions according to a graphic API and necessary to generate the appropriate microcode are compiled into binary form processable by CPU 501 but are shown as uncompiled, edited pseudo-code in FIG. 10 for the purpose of clarity.

Various APIs may be used to generate the above micocode. In the preferred embodiment of the present invention, the API is the OpenGL programmer interface, but it will be readily apparent to those skilled in the art that alternatives such as Microsoft's DirectX or nVidia's Cg may be equally suitable.

In accordance with programming principles, it is necessary to initially declare 1001 said GUI as an object to be constructed which, in the preferred embodiment, is a "UIcontainer" object 1002. Indeed, to the contrary of GUIs according to the known prior art, which comprise two-dimensional representations of data processing functions only and are thus traditionally implemented as bitmaps, the present GUI is created as a three-dimensional object comprising a polygon or a mesh of a plurality thereof. Thus, CPU 501 need only generate microcode for graphics card 506 to process and generate the output GUI, e.g. a task for which CPU 501 is optimised, instead of CPU 501 having to process graphics data in the form of bitmaps according to the known prior art, e.g. a task which is computationally-intensive for CPU 501.

Further to declaring and constructing the UIcontainer 1002, the various processing nodes present in the user interface structure are subsequently declared and constructed at 1003 within said UIcontainer 1002, whereby the representations of the processing functions, and data thereof where appropriate, are thus also generated as three-dimensional objects.

In order to configure the UIcontainer object with variable opacity, a blending function 1004 is enabled at 1005 and then parameterised at 1006 as an alpha-blending function. Said parameterisation 1006 allows the corresponding microcode to instruct the graphics processor(s) of graphics card 506 to configure the card's output and frame buffer with an alpha-channel and thus switch the image data output mode to RGBA at 1007. Moreover, the UIcontainer object is preferably configured with a maximum size 1008, such that regardless of the number of said various processing nodes present in the user interface structure and declared and constructed at 1003, said user interface may not exceed a pre-defined portion of the total displayable area of VDU 408.

Upon completing the declaration and construction of the UIcontainer object 1002 configured with representations of image-processing functions 1003, and various parameterisations 1004 to 1008, an ObjectDraw function is called at 1009, whereby the microcode generated from this particular command instructs graphics card 506 to draw the user interface in the graphics card's frame buffer, as will be further described in the present description, before outputting to VDU 408. A destructor function 1010 is eventually called in order to remove the Ulcontainer object 1002 from the frame buffer, thus the image data output of graphics card 506, when the user interface is no longer required by user 407 for selection and/or interaction therein/therewith.

FIG. 11

According to the preferred embodiment of the present invention, said user interface comprises a structure of hierarchical nodes, whereby each node defines a representation of a particular image data-processing function. An example of such a structure according to the present invention is shown in further detail in FIG. 11.

The UI container object 1002 is first declared at 1101 because it is the root node 1101 of said hierarchical structure. In terms of the structure, said root node is the topmost parent node, which "pulls" data from all of its children nodes. Children nodes of node 1101 may also be parent node of further sub-levels of children nodes themselves. Since a fundamental property of the user interface is its opacity, the corresponding node 1102 contains a function to process the transparency data defining the user-definable level thereof read from the configuration file at 815, whereby upon node 1102 retrieving all of the data required to build the UI object declared at 1101 from said sub-levels, said function can confer a level of transparency to the object generated therefrom.

Another fundamental property of the UI object 1002 is its size, i.e. the size of the three-dimensional UI polygon expressed with pixel width, pixel height and having a unitary depth. In the preferred embodiment, said size varies upon the number of user-operable and user-independent processing nodes to be represented thereon according to the selection of image editing functions by user 407, whereby the size node 1103 pulls the input of all of its children nodes to generate an appropriately-sized object 1002.

A first children node 1104 of size node 1103 is provided as a "re-sized event", a function to allow user 407 to manually change the optimum UI object size generated at said node 1103 if required. The event node 1103 is a typical example of a data processing function to which the UI mapping function 903 would associate user input by user 407 for effecting such resizing, whereby the condition 905 would be positively satisfied and, in accordance with the above-described principle, the size node 1103 would receive input from re-sized event node 1104 started at 906.

A second children node of the size node 1103 is itself a "widget" parent node 1105, the function of which is to pull all of the data processed by its children which define the representations and attributes thereof according to the selection of image editing functions by user 407. In the example, user 407 will require a plurality of user operable and user independent widgets, with which said user may subsequently interact in order to edit the image data selected at step 604 according to step 608. User 407 will require a colour correction widget, such as widget 310, whereby a first "colour correction" child node 1106 of widgets node 1105 is declared as an RGB colour components processing function. User 407 may also need to edit the colour saturation of said loaded image data, thus a colour saturation widget is provided under the form of a second "colour saturation" child node 1107 of widget node 1105 declared as another RGB colour component processing function.

An example of a user independent processing node to be represented in UI object 1002 is a third "object properties" child node 1108 of widget node 1105, the function of which is simply to process the input generated by user 407 interacting with colour suppression widget 1106 and colour saturation widget 1108 to output alpha numerical values, such that user 407 may accurately determine the extent of the editing formed by means of said interaction. For this purpose, node 1108 is linked to nodes 1106 and 1107, whereby said nodes 1106 to 1108 may be understood as "siblings" nodes and wherein said node 1108 pulls the respective input data of both said nodes 1106 and 1107. Said input data is the red, green and blue colour component values of each pixel of the loaded image frame and said values are generated by a child node 1109 of colour correction widget 1106 and a similar child node 1110 of colour saturation node 1107. The "object properties" node 1108 is configured with a "value editor" child node 1111, the function of which is to process alpha numerical data input by means of keyboard 409 for precise colour correction or saturation, as an alternative to the manipulation/interaction with widgets by means of mouse 410 or tablet 411.

Another example of sibling nodes featuring both user interactive and user independent functions is provided by a "player" child node 1112 of widget node 1105 and a sibling "frame counter" node 1113, which is also a child node of widget node 1105. Player node 1112 pulls input data from a plurality of respective children nodes 1114 to 1118, each of which represents a function processing input data to the effect that a sequence of frame should be rewound (1114), paused (1115), played (1116), stopped (1117) or fast forwarded (1118). Said player node 1112 is a user interactive node, whilst sibling frame counter node 1113 is user independent and is related to said player node 1112 in order to obtain data identifying the total number of frames in the sequence interacted with by means of nodes 1114 to 1118 and the position of the player index at any one time within said sequence. In the example, a final "undo" child node 1119 of parent widget node 1105 is provided, the interaction of user 407 with the representation thereof within the UI object 1002 returns the image data to its pre-processed state, for instance before it was last colour corrected or desaturated.

FIG. 12

Figure 11:
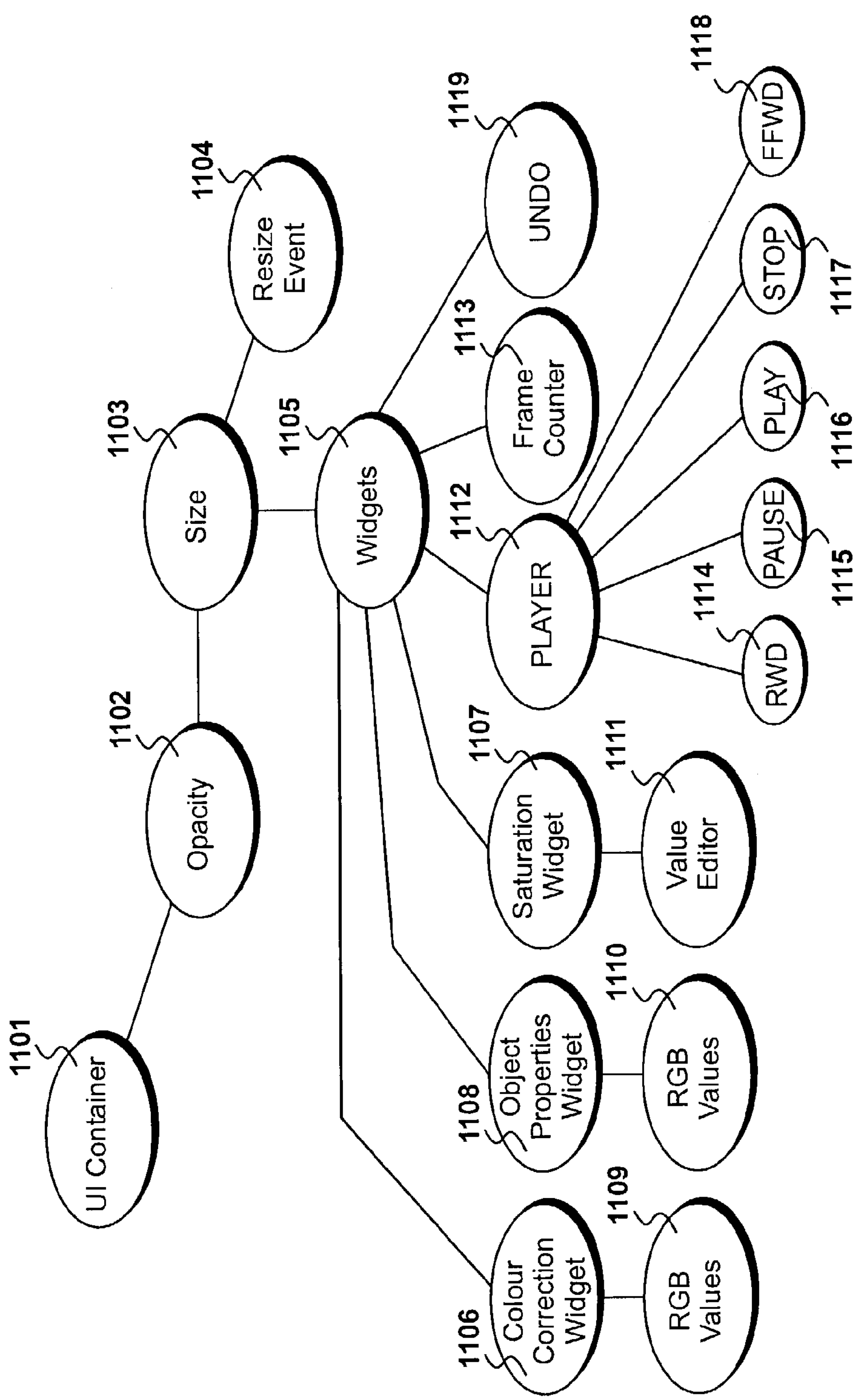
FIG. 11 further details the GUI tree shown in FIG. 10.
Figure 12:
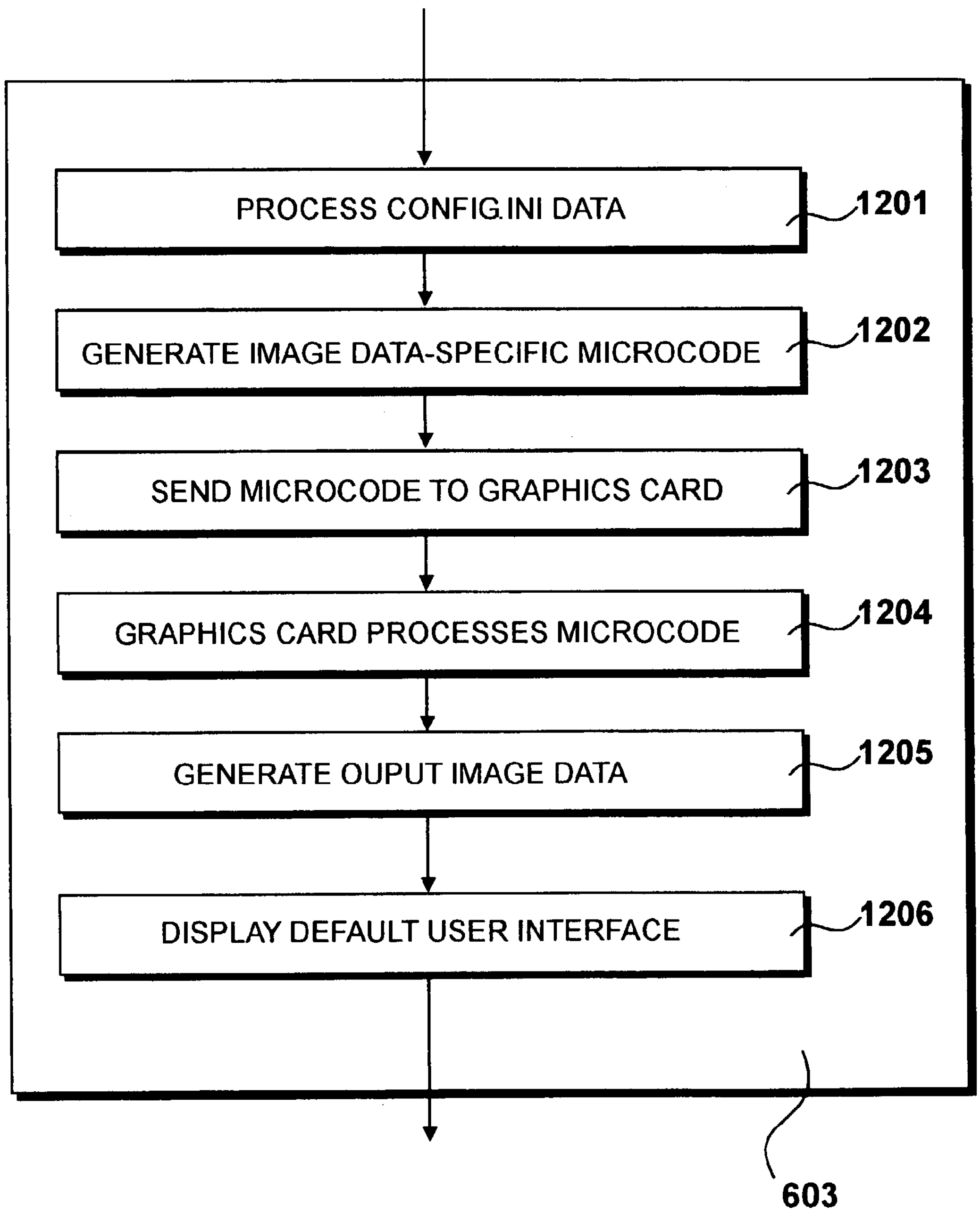
FIG. 12 further details the operational steps according to which the configuration file shown in FIG. 8 is processed in relation to the GUI tree shown in FIG. 11 to generate the microcode shown in FIGS. 7 and 10.

The processing step 603 of starting the processing of the instructions according to the present invention as described in FIGS. 8 to 11 is further detailed in FIG. 12.

At step 1201, CPU 501 processes the configuration file 706 further described in FIG. 8, whereby the "load UI" instruction 814 and its corresponding transparency parameter 815 prompts said CPU 501 to process the microcode-generating instructions shown in FIG. 10 so as to generate image data-specific microcode at step 1202, ie the UI polygon 1101 and its attributes described in FIG. 11.

At step 1203, CPU 501 forwards the microcode-generated at step 1202 to graphics card 506, the dedicated processor or processors of which thus process said microcode at step 1204, whereby output image data is thus generated at step 1205 in the form of pixels, each having red, green and blue colour component values and an alpha channel attribute. Said output image data is preferably the first output to memory means of said graphics card 506, wherein said memory means are configured as a frame buffer, the functionality of which will be described further in the present embodiment.

It should be emphasised that processing steps 1201 to 1205 are carried out upon starting the image processing application 702, therefore CPU 501 generates microcode defining the default user interface at step 1202 according to the configuration file processed at step 1201 only once. Thereafter and for each sequence processing cycle, CPU 501 will generate image data-specific microcode to generate the UI container 1101 only if user 407 provides any input data, for instance selecting image data at step 604, ie if an event 902 is triggered. Indeed, the absence of any input data may be translated as image processing system 401 not having to process any new data to update the display thereof, whereby graphics card 506 receives no correspondingly-updated microcode and thus simply cycles the contents of the frame buffer displayed at step 1206.

FIG. 13

Figure 13:
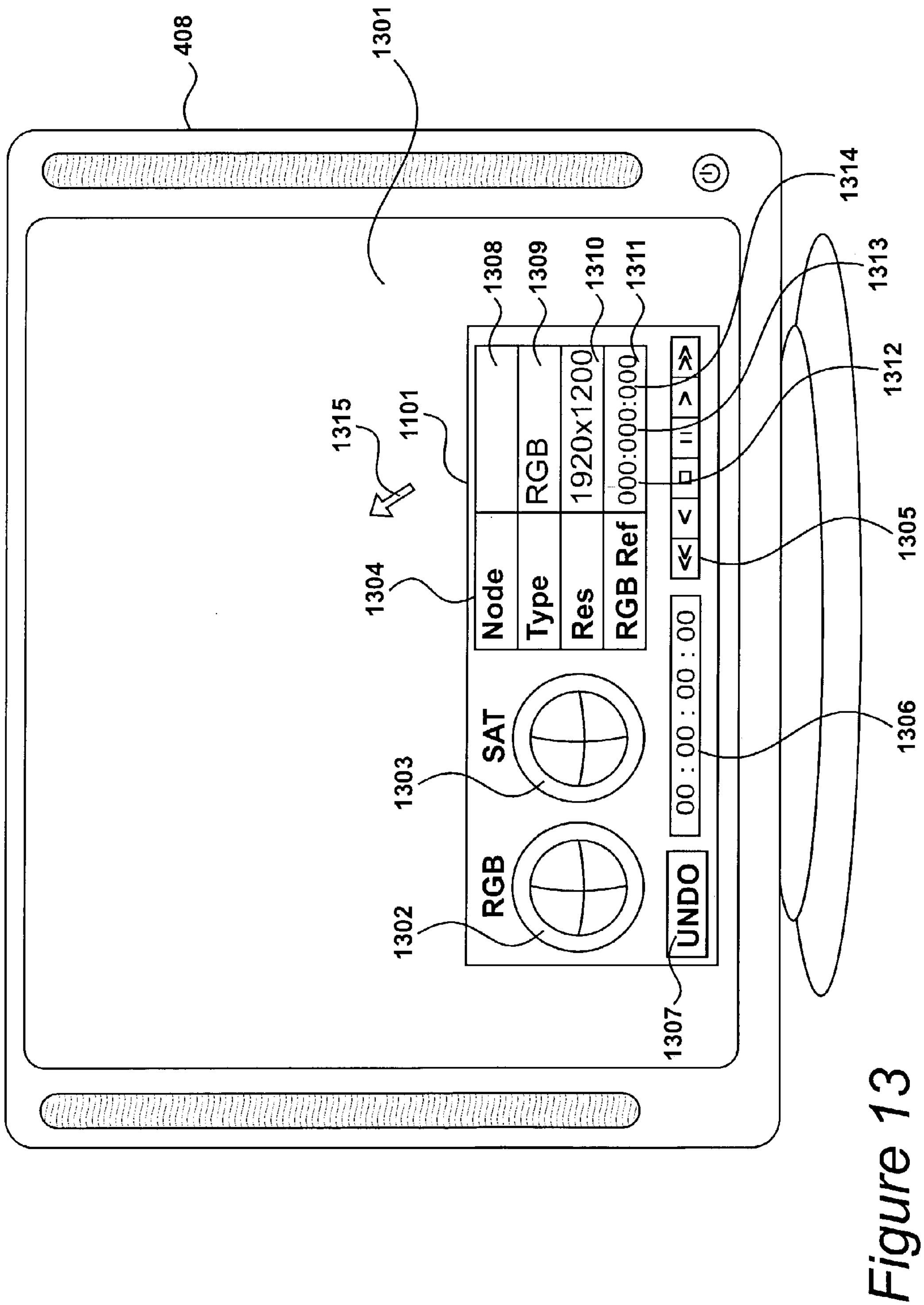
FIG. 13 shows the graphical user interface of an image processing application according to the present invention, used to edit and process the structure shown in FIG. 2, which includes representations of image processing functions configured with an opacity.

The graphical user interface of the image processing application 702 is shown in FIG. 13 and includes a representation of the UI container object 1101 generated and displayed according to processing steps 1201 to 1206.

The UI container 1101 is depicted as integral part of the graphical user interface 1301 of image processing application 702 displayed on VDU 408. Most of said graphical user interface 1301 contains no image data because user 407 has yet to select said image data according to step 604. Consequently, most of the image data processing function representations contained within UI container 1101 are generated in their default state.

UI container 1101 thus includes a first interactive representation 1302 of the colour correction widget 1106, a second interactive representation 1303 of the saturation widget 1107, a non-interactive properties portion 1304 representing the properties widget 1108, an interactive representation 1305 of the player widget 1112, a representation 1306 of the non-interactive frame counter widget 1113 and an interactive representation 1307 of the undo widget 1119. In the example, both portion 1304 and representation 1306 respectively feature one or a plurality of alpha numerical data display areas. For instance, representation 1306 displays numerical values initiated at zero for, respectively, hours, minutes, seconds and frames, because user 407 has not yet selected image data at step 604 and thus there exists no index position for the player 1112 within a sequence loaded at step 604. Similarly, UI container portion 1304 includes for instance a first display area 1308 which will display the name and/or reference of a node being edited by user 407, for instance a node of the scene 103 as shown in FIG. 2. Portion 1304 also includes a type definition area 1309, which displays the type of data contained by said node, thus would display "RGB" if the node currently edited is a frame such as image frame 203, which is defined as RGB image data.

A current resolution display area 1310 derives the data contained therein from the processing of the configuration file 706, more specifically the instruction line 811, providing user 407 with feedback as to what the default resolution of graphical user interface 1301 is at start up, thus also representing the operating mode of graphics card 506 and the two-dimensional size of its frame buffer. Finally, an RGB colour component values display area 1311 is provided, within which the respective red (1312), green (1313) and blue (1314) colour component values 1109 or 1110 are displayed in function of user 407 respectively interacting with the representation 1302 of the colour correction widget 1106 or the representation 1303 of the saturation widget 1107. An additional functionality of area 1311 is provided to allow user 407 to edit said R, G or B colour component values directly therein, by means of invoking the value editor 1111 of the properties widget 1108, as opposed to interacting with said representations 1302 or 1303.

In accordance with the description thereabove, user 407 may interact with a GUI-wide pointer 1315, the translation and movement of which within GUI 1301 is derived from the two-dimensional planar movement of either mouse 410 or tablet 411, position said pointer 1315 in regard of any of alpha numerical values 1312 to 1314, whereby CPU 501 will map the position thereof (901 to 905) to said value editor function 1111 and invoke the functionality thereof (906).

FIG. 14

Figure 14:
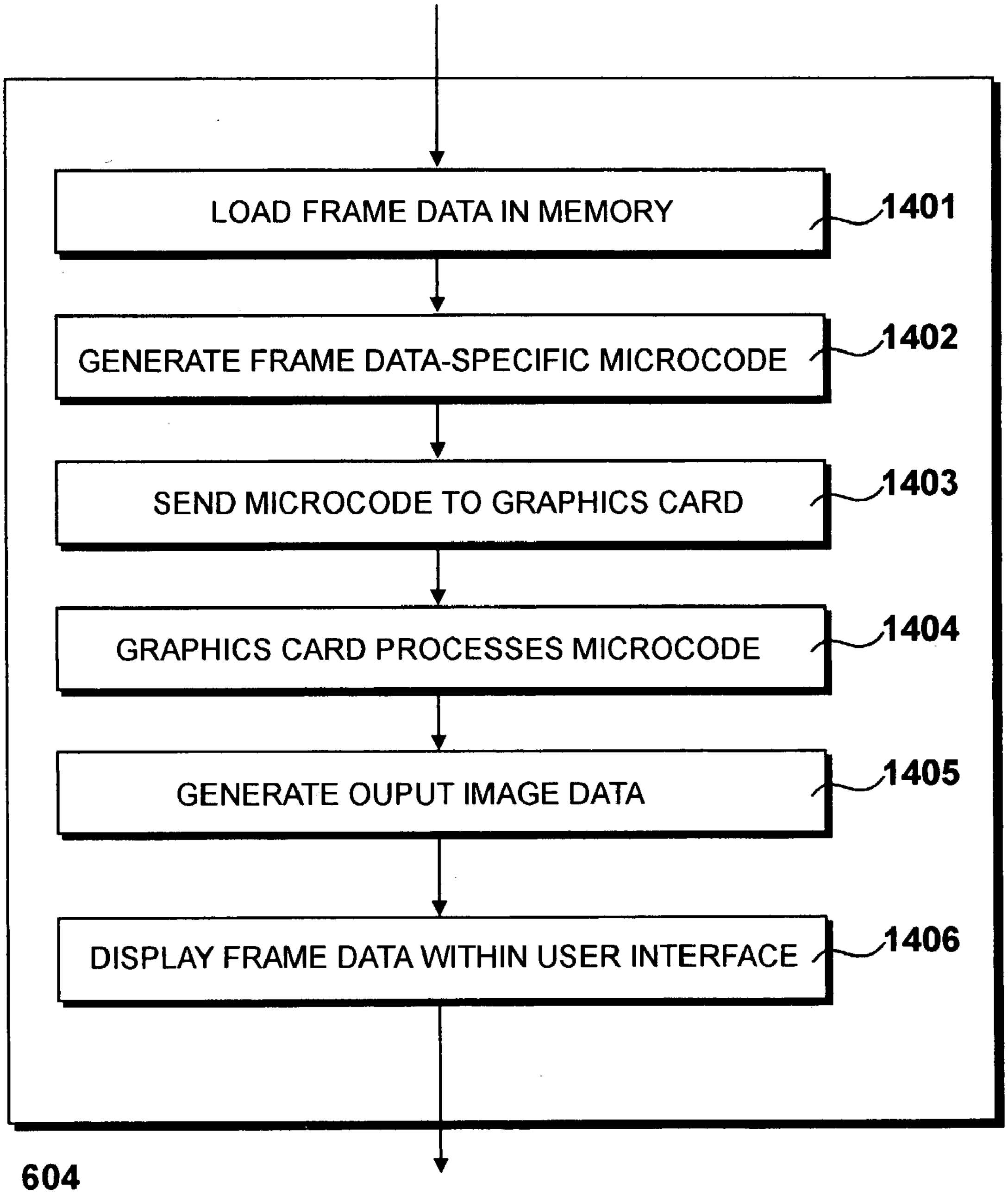
FIG. 14 further details the operational steps according to which the image data shown in FIGS. 1 and 2 is processed to generate the microcode shown in FIG. 7.

The processing step 605 of selecting image data for outputting a frame to be edited within the user interface 1301 according to the present invention is further detailed in FIG. 14.

At step 1401, CPU 501 accesses the frame image data from HDD 505, optical medium 403, magnetic medium 406, server 412, the internet 413 or frame store 415, whereby said image data is loaded locally into random access memory 503, such that said CPU 501 can process the microcode-generating instructions shown in FIG. 10 to generate frame image data-specific microcode at step 1402, ie a frame-sized polygon and its attributes.

At step 1403, CPU 501 forwards the microcode generated at step 1402 to graphics card 506, the dedicated processor or processors of which process said microcode at step 1404, whereby output image data is thus generated at step 1405 in the form of pixels, each having red, green and blue colour component values and an alpha channel attribute. Said output image data is preferably the second output to memory means of said graphics card 506, wherein said memory means are configured as a frame buffer, the functionality of which will be described further in the present embodiment.

It should be emphasised that processing steps 1401 to 1405 are carried out upon selecting frame image data, and with CPU 501 having already generated microcode defining the default user interface at step 1202 according to the configuration file processed at step 1201, CPU 501 now generates image data-specific microcode for each processing cycle to generate the UI container 1101 and the frame within user interface 1301, because user 407 has now provided input data in the form of frame image data. Graphics card 506 thus receives correspondingly-updated microcode and outputs the contents of the frame buffer displayed at step 1406.

FIG. 15

Figure 15:
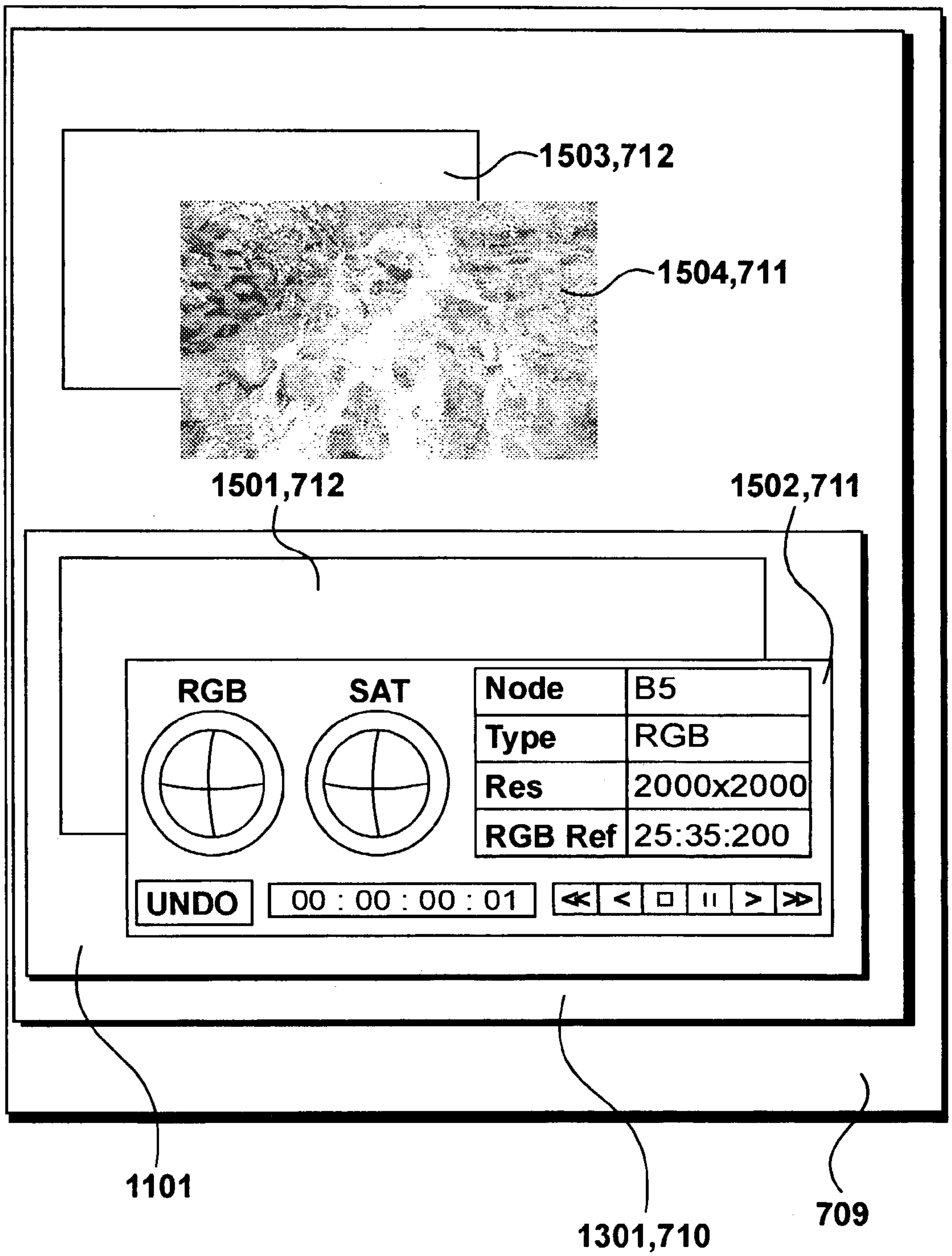
FIG. 15 provides a graphical representation of the microcodes respectively shown in FIGS. 12 and 14 when processed by the graphics card shown in FIG. 5.

The microcode 709 generated by CPU 501 at step 1402 upon user 407 selecting image data according to step 604 is shown in Further detail in FIG. 15, a portion of which already includes the user interface, image data-specific microcode generated according to the present invention at step 1202.

Figure 7:
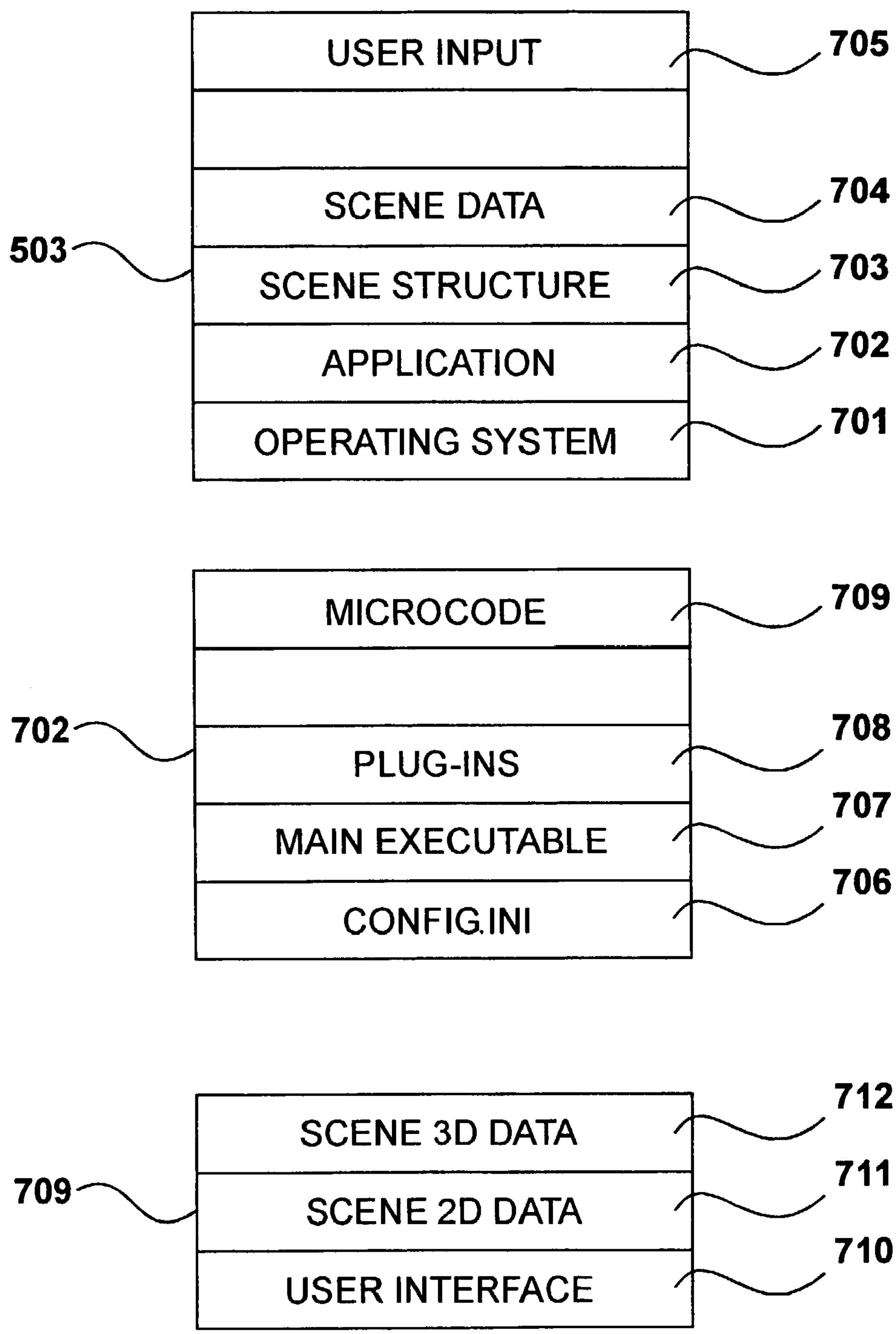
FIG. 7 shows the contents of the memory shown in FIG. 5 upon completing the image data selecting step shown in FIG. 6, including an image processing application, a configuration file and microcode sent to the graphics card shown in FIG. 5.

In effect, FIG. 15 illustrates the relationships between the user interface data 710, the two-dimensional data 711 and the three-dimensional data 712 within said microcode 709 as described in FIG. 7. At any point in time during the operation of image processing system 401, the graphics card 506 thereof outputs the graphical user interface 1301 to VDU 408, whether it includes selected frame data according to step 1406 or not, as shown in FIG. 13. Microcode 709 therefore first and foremost includes user interface data 710, within which all the other user interface components defined as two-dimensional data 711 and three-dimensional data 712 are nested.

Microcode 709 also includes data 711, 712 necessary to generate the representation of the UI object 1101 illustrated in FIG. 13. Thus, within microcode 709 said UI container 1101 is defined by first microcode portion 1501 defining a three-dimensional polygon, the size of which is derived from size node 1103, such that graphics card 506 can perform all required three-dimensional data processing (such as scaling, translating and/or rotating) required to successfully display UI container 1101. The UI object 1101 is next defined by a second microcode portion 1502 describing the two-dimensional data 711 to be mapped onto said polygon 1501, whereby said two-dimensional data is derived from the output of the widget node 1105 and includes representations 1302 to 1314.

In accordance with the present invention, the microcode 709 generated at step 1202 includes user interface data 710 and portions 1501 and 1502 only. Upon user 407 selecting image data at step 604 and thus loading said frame data in image processing system 401, preferably in memory 503 at step 1401, the microcode 709 generated at step 1402 similarly includes said user interface data 710 and portions 1501 and 1502, but also includes two-dimensional data 711 and three-dimensional data 712 defining said loaded frame data such that it may be processed then displayed by graphics card 506. Thus, further to microcode portions 1501 and 1502 being nested with user interface data 710, a third microcode portion 1503 is generated as three-dimensional data 712 and is a polygon similar to polygon 1501, but having a size derived from the loaded frame's respective frame node within the sequence process tree, for instance frame node 203. The frame is therefore initially defined as a three-dimensional object which, in a manner similar to polygon 1501, may be translated, scaled and/or rotated in order to successfully display said frame within user interface 1301. A fourth microcode portion 1504 is similarly generated at said step 1402 as two-dimensional data 711, which defines the contents of the frame-polygon 1503, ie the image itself expressed as a collection of pixels having respective red, green and blue colour component values, as was the case of UI object to the data 1502.

Those skilled in the relevant art will be familiar with the processing capabilities and functionality of graphics accelerators such as graphics card 506, whereby potentially millions of polygons may be configured with two-dimensional data 1502, 1504, usually referred to as a polygon texture, and the processing thereof in order to accumulate final output data within memory means of said graphics card 506 configured as a frame buffer.

FIG. 16

Figure 16:
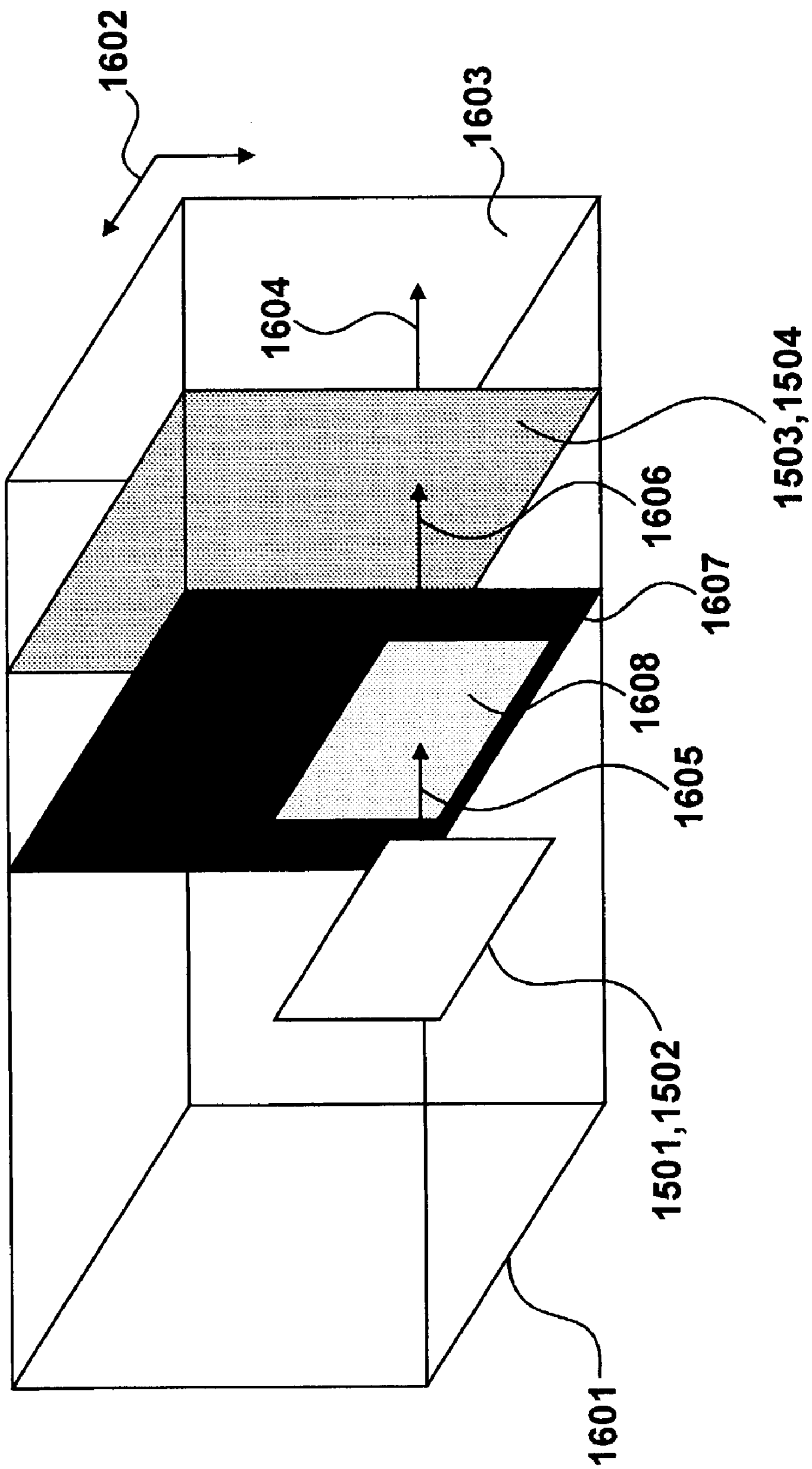
FIG. 16 provides a graphical representation of the processed microcodes shown in FIG. 15 when they are written to the framebuffer of the graphics card shown in FIG. 5.

The processing of the microcode 709 shown in FIG. 15 within the graphics card 506 according to step 1404 is illustrated in further detail in FIG. 16, wherein a frame buffer of graphics card 506 is shown as having said processed microcode written thereto according to step 1405.

The frame buffer 1601 is figuratively represented as having a two-dimensional size 1602 and a depth represented for the purpose of showing output image data interactively written thereto, a process also known to those skilled in the art as "passes". Said frame buffer size 1602 is derived from CPU 501 processing configuration instructions 811, thus sending corresponding microcode to graphics card 506 at initialisation defining said size 1602.

According to the present invention, the UI object 1101 is blended with the selected image data within the user interface 1301 by means of instructions 1006. In this context, said blending works by adding the incoming source pixels, e.g. the frame object 1503, 1504 and the UI container object 1501, 1502, and the frame buffer destination pixels 1603. For example, if a pixel of the UI container object 1101 contains a pixel having the following RGBA value (0.5, 0.5, 0.5, 1.0) and the frame buffer already contains the following RGBA value of (0.7, 0.8, 0.9 1.0), then the resulting pixel will be (1.2, 1.3, 1.4, 2.0). However, alpha channel values are clamped to 1.0 (which amounts to maximum opacity), which thus means that the final pixel RGBA value will be (1.2, 0.3, 1.4, 1.0). It is possible to multiply the respective values of the source and destination pixels by a specific API term, for instance the GL-SRC-ALPHA, GL-1, GL-1- minus -SRC-ALPHA shown in FIG. 10 or zero. Therefore, for example, if the incoming source pixel is multiplied by ONE and the destination frame buffer pixel is multiplied by ZERO, then the output image data will include the source pixel only. In the example, the specific term is specified by configuration instructions 813 for the frame data and 815 for the UI object 1101 respectively, thus when graphics card 1506 writes the frame object 1503, 1504 to the frame buffer 1601 during a first pass 1604, the red, green, blue and alpha channel colour component values of each pixel of said frame object are multiplied by 1.0, signifying that said frame data is processed and displayed in full colour at full capacity.

According to the present invention, a second pass is required to write the UI container object 1101 to frame buffer 1601 and confer a degree of transparency thereto. After the first pass 1604, the frame data 1503, 1504 written to 1603 comprises the destination pixels and the UI container 1501, 1502 comprises the source pixels. Said source pixels thus have an alpha value of 0.5 according to configuration instructions 815, whereby when graphics cards 506 processes microcode 709 for said second pass, blending calculations are performed upon both source and destination pixels, wherein said source pixels 1501, 1502 are multiplied by their alpha channel value 0.5 and the destination pixels 1503, 1504 are multiplied by one minus said source pixels alpha channel value.

Said second pass is shown split into multiple phases to further detail said blending calculations. In a first phase 1605, the source pixels 1501, 1502 are multiplied by their alpha channel value 0.5. In a second phase 1606, the destination pixels are multiplied by 1–0.5, thus an alpha channel value of 0.5. The resulting alpha channel image data 1607 thus comprises pixels having respective alpha channel values of either 0.5 (shown in black) or 1 shown at 1608, as calculated source (1605) and destination (1606) are added together.

The final output image data written to frame buffer 1601 upon completing step 1405 thus includes both blended and unblended pixels 1603 of both UI container 1501, 1502 and frame 1503, 1504.

FIG. 17

The contents of the frame buffer 1603 displayed at step 1406 are illustrated on VDU 408, whereby user 407 may now select a first image data-processing function according to step 605, for instance by means of pointer 1315.

According to the writing operations performed in buffer 1601 further detailed in FIG. 16, the user interface 1301 therefore includes primarily image data 1701 depicting the first frame 203 of a "water cascade" frame sequence 103, wherein said image data 1701 results from the processing of graphics data 1503, 1504 and further processed according to second rendering pass 1605, 1606. The user interface 1301 also includes a representation 1702 of the UI container object 1101, a substantial proportion of the pixels 1703 of which have been blended with said graphics data 1503, 1504 according to said second rendering pass 1605,1606, whereby a level of transparency has been conferred thereto such that the portion of image date 1701 "underneath" the representation 1702 remains visible under the contents thereof.

According to the present invention and in accordance with the present description, only the pixels 1703 of the representation 1702 of UI object 1101 that do not define representations of image data processing functions or properties thereof are blended, whereby user 407 may still interact with representations 1302 to 1315 which remain visible by means of their respective outlines. For instance, the representation 1306 of the frame counter node 1113 remains visible only by means of the counter outline 1704 and within which the above-described first frame 203, 1701 is referenced at 1705 by incrementing the index of the player node 112. Similarly, the representation 1304 of the object properties widget 1108 remains visible by means of its outline 1706 and its respective properties data display areas 1308 to 1311 are updated with the property data of said frame 203, 1701. Thus, in the example, the image data 1701 is references as image data acquired by node 203 at 1707, the native resolution of said image frame is indicated at 1708 as the "2K" movie frame format and the colour component format of image data 1701 is referenced at 1709 as thirty-two bits RGB.

User 407 may interact with any of said transparent representations 1302 to 1314 by means of pointer 1315, which also remains visible by means of its outline 1710.

FIG. 18

Figure 18:
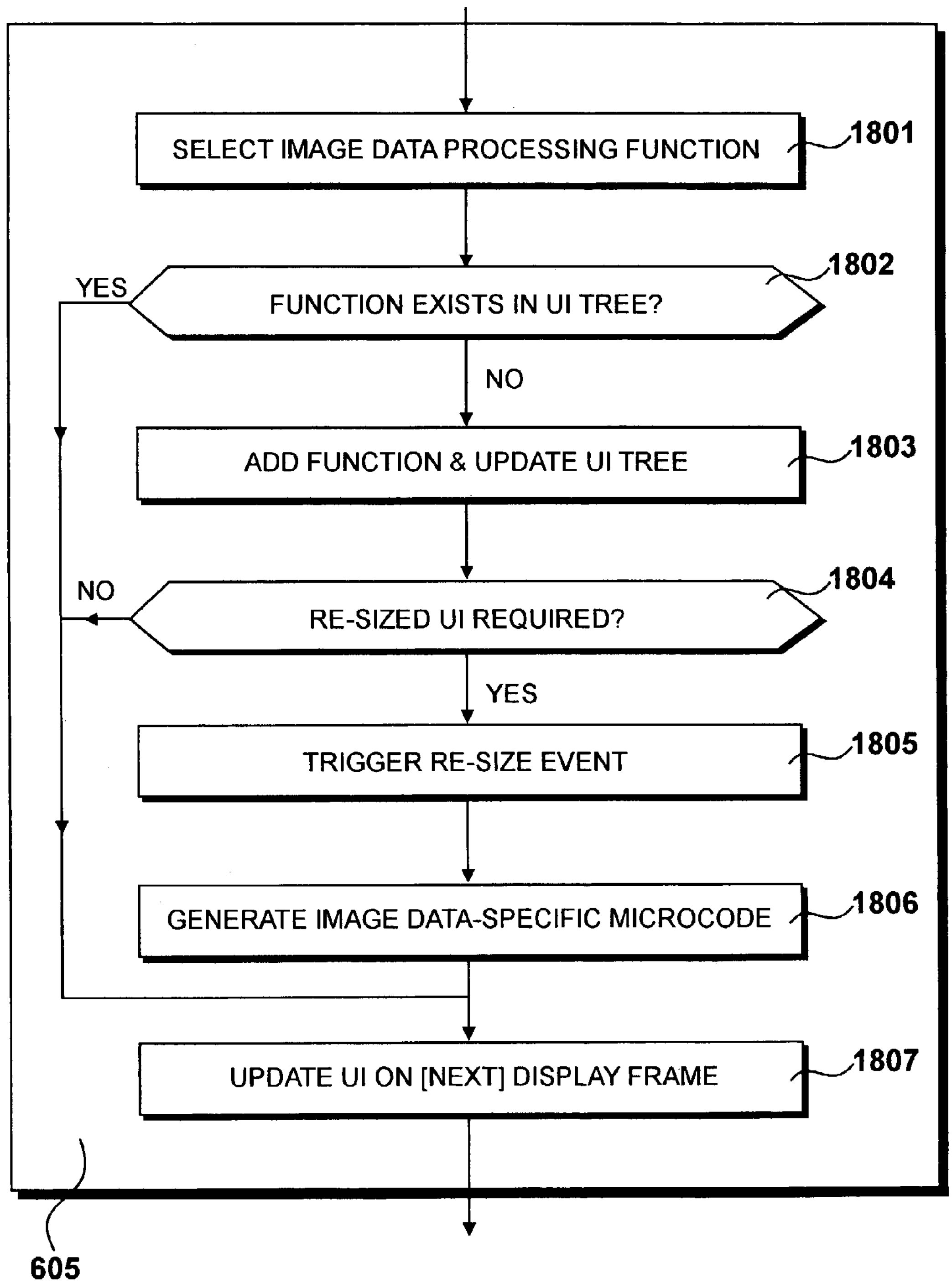
FIG. 18 further details the operational steps according to which image data processing functions are selected according to user input.

The processing steps according to which user 407 selects image data-processing functions according to step 605 within the transparent representation 1702 of the UI container object 1101 in user interface 1301 at runtime are further detailed in FIG. 18.

At step 1801, user 407 selects a first image data-processing function, for instance by means of imparting a planar movement to mouse 410, the two-dimensional input data of which is processed by the operating system 701 to translate the outline 1710 of pointer 1315 over any representation 1302 to 1314 of an image processing function defined by its respective outline. Said selection step 1801 may equally involve said user 407 pressing a key of keyboard 409, for instance because said representations 1302 to 1314 generated according to the default configuration data shown in FIG. 11 do not include a specific image data-processing function required, a representation of which is thus not initially included in representation 1702.

A question is thus first asked at step 1802, as to whether the image data-processing function selected by the user exists in the UI tree at runtime, e.g. whether the mapping function shown in FIG. 9 has manifestly failed to map the user input data to a function node therein. If the question of step 1802 is answered negatively, application 702 fetches said missing function in order to update said UI tree, whereby said function could for instance be a dynamically-loaded plug-in downloaded from the Internet 413 subsequently to the initialisation of application 702 according to step 603.

The updating step 1803 prompts a second question at step 1804, as to whether application 1702 needs to re-size the representation 1702 of the updated UI container object 1101 to accommodate the representation of the then-missing, now-loaded function added at step 1803. If the question of step 1804 is answered positively, a re-size event is triggered at step 1805, whereby the UI container size data generated by size node 1103 is updated by the output of the re-size function node 1104 so triggered.

Having updated the function node configuration of the UI tree shown in FIG. 11 at step 1803 and the size of the representation 1702 at step 1805 if needs be, CPU 501 may now generate corresponding microcode 709 at step 1806 such that the processing thereof by graphics card 506 will in turn update said representation 1702 accordingly. With reference to questions 1802 and 1804, if the question of step 1802 is answered positively, the image data-processing function selected at 1801 already exists within the UI tree shown in FIG. 11 and thus in representation 1702, whereby this function is called to process further input data generated by user 407. The user interface 1301 and all components thereof is refreshed, or updated, at the next step 1807 in accordance with the output of said triggered image data processing function. Similarly, if the question of step 1804 is answered negatively, the selected image data-processing function added at step 1803 does not require the representation 1702 to be re-sized, whereby control is again directed to the user interface updating step 1807.

FIG. 19

The contents of image frames, such as the water cascade depicted by image frame 203, may vary to a fairly large extent in terms of the detail or information depicted therein. For instance, if the frame was instead depicting talent shot against a blue background or green background for subsequent compositing, only a relatively small portion of the image data may require editing, such as the hue or saturation of the uniformly-coloured background or the colour properties of the talent. In the present example however, the entire image frame depicts fairly complex information, e.g. the pixels thereof have widely-varying colour component values since they depict water, stone and some foliage with varying degrees of intensity according to areas of light and shadows. The default transparency level 815 may therefore still prove too high to allow user 407 to observe the entire image frame whilst at the same time interacting with representations of image data-processing functions. In effect, user 407 may find the representation 1702 too obstructive, in the manner of the prior art user interface shown in FIG. 3, whereby the question of step 606 is answered positively and the user interface requires reconfiguring according to step 607, the processing steps of which are further described in FIG. 19.

A transparency level condition is first processed by application 701 at step 1901, whereby said transparency level is defined as a variable Op existing within a range, wherein a value of zero amounts to full transparency of the representation 1702 and a value of one amounts to full opacity of said representation. The above condition is processed at step 1901 upon user 407 providing user input to the effect that the user interface should be reconfigured at step 607, thus said user 407 is preferably prompted to input data to be processed by application 702 as said transparency level variable Op, whereby said user input is thus read at step 1902.

A question is subsequently asked at step 1903, as to whether the user-inputted transparency level Op differs from the default value 815 of the configuration file 706, thus a simple arithmetic function processes said difference and, in the case of a substraction total different from a null result, whereby question 1903 is answered positively, the CPU 501 processes the API-specific instructions shown in FIG. 10 with including the user-inputted transparency level variable Op to generate corresponding microcode at step 1904. The user interface 1301 and representation 1702 are therefore updated upon graphics card 506 processing said microcode according to steps 1202 to 1206 and, further 1402 to 1406, wherein the blending parameters of pixels 1703 have similarly been updated, thus modified their respective red, green, blue and alpha colour component values. Alternatively, the substraction performed at step 1903 returns a null value, whereby the user inputted transparency level variable Op is ignored.

FIG. 20

Figure 20:
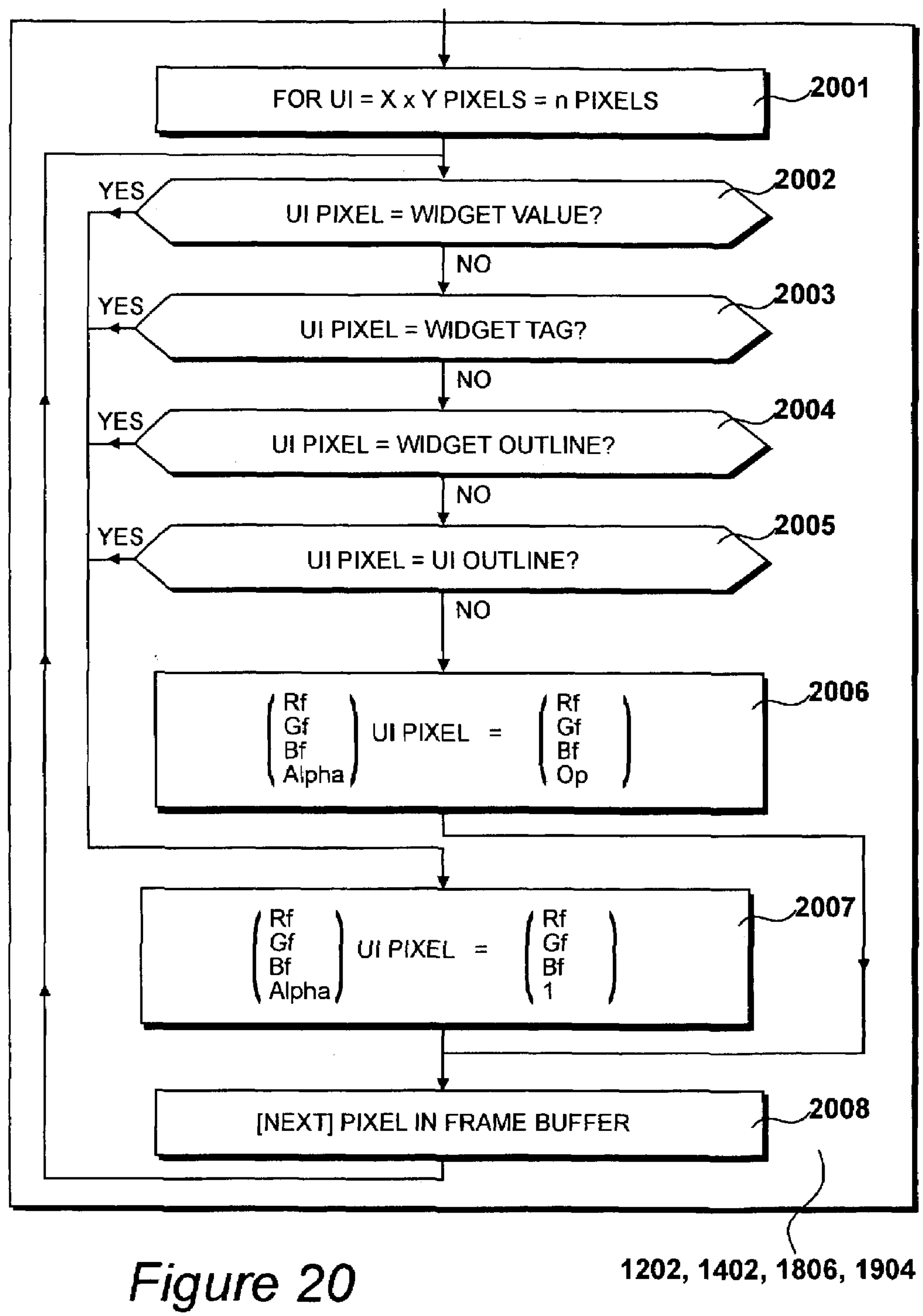
FIG. 20 further details the operational steps according to which respective representation and image data pixels are blended.

At each of the microcode generating steps 1202, 1402, 1806 and 1904, the instructions 702 configure CPU 501 according to the present invention to output graphics data to graphics card 506 and sub-processing instructions to said graphics card 506 with which to process said graphics data in order to achieve the successful blending of image data 1701 with representation 1702 within user interface 1301. Said sub-processing instructions are further detailed in FIG. 20.

At step 2001, a first condition is set which defines the total number of pixels to be processed in order to generate one display frame of user interface 1301, whereby graphics card 506 iteratively processes each of said pixels according to the following steps until all pixels have been processed and control is automatically returned to said step 2001.

Thus, upon defining said total number of pixel, the first pixel in the array 1603 is selected and a first question is asked at step 2002 as to whether said pixel describes a data value, for instance the alpha numerical value 1312 generated by RGB value node 1109 of a red colour component value interacted with. If the question of step 2002 is answered negatively, a second question is asked at step 2003 as to whether said first pixel defines a widget tag or name, for instance if said pixel forms part of the "undo" visual reference of the representation 1307 of the undo node 1119. If the question of step 2003 is answered negatively, a third question is asked at step 2004 as to whether said first selected pixel defines a widget outline, for instance the outline 1704 of the representation 1306 of the frame counter node 1113. If the question of step 2004 is answered negatively, a final question is asked at step 2005, as to whether said first selected pixel defines the outline of Ul object representation 1702, the size of which may vary. If the question of 2005 is answered negatively, said first selected pixel is by default a Ul container object 1501, 1502 to be blended as a pixel 1703 and its respective RGBA colour component values processed with an alpha channel value equal to Op at step 2006.

Alternatively, if any of questions 2002 to 2005 are answered positively, said first selected pixel is not to be blended as a pixel 1703, because it defines either an alpha numerical value, widget name or outline or the UI container outline and thus should remain visible at all times, whereby its RGBA colour component values are processed at step 2007 with a forced alpha channel component of one, signifying full opacity. Upon generating said first selected pixel as either a blended pixel 1703 or a "solid" (opaque) pixel, the next pixel of the UI container object 1501, 1502 is selected in the frame buffer at step 2008.

FIG. 21

Figure 17:
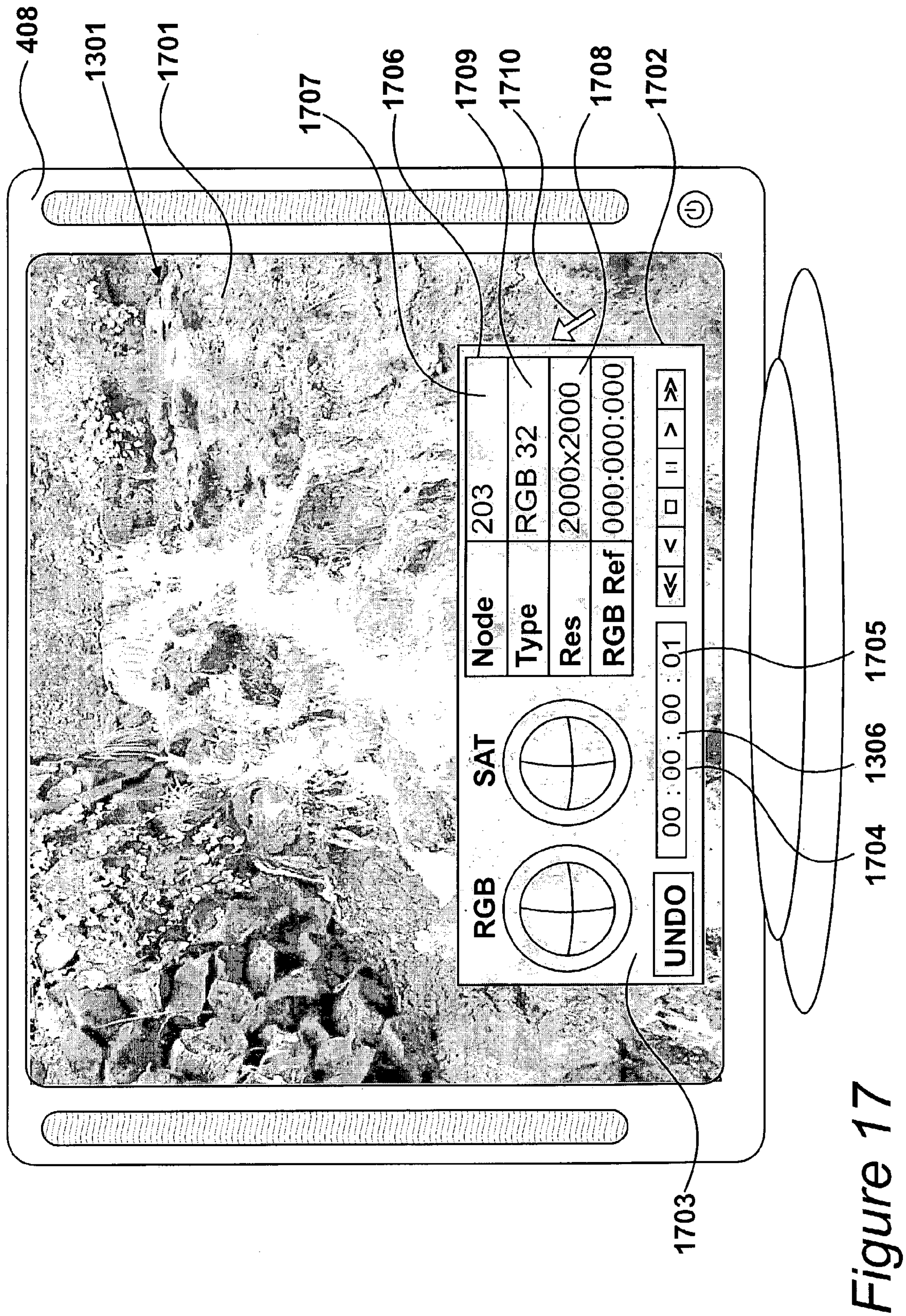
FIG. 17 shows the graphical user interface shown in FIG. 13 including the image data shown in FIGS. 14 to 16, wherein said representations and image data are blended according to the present invention.
Figure 19:
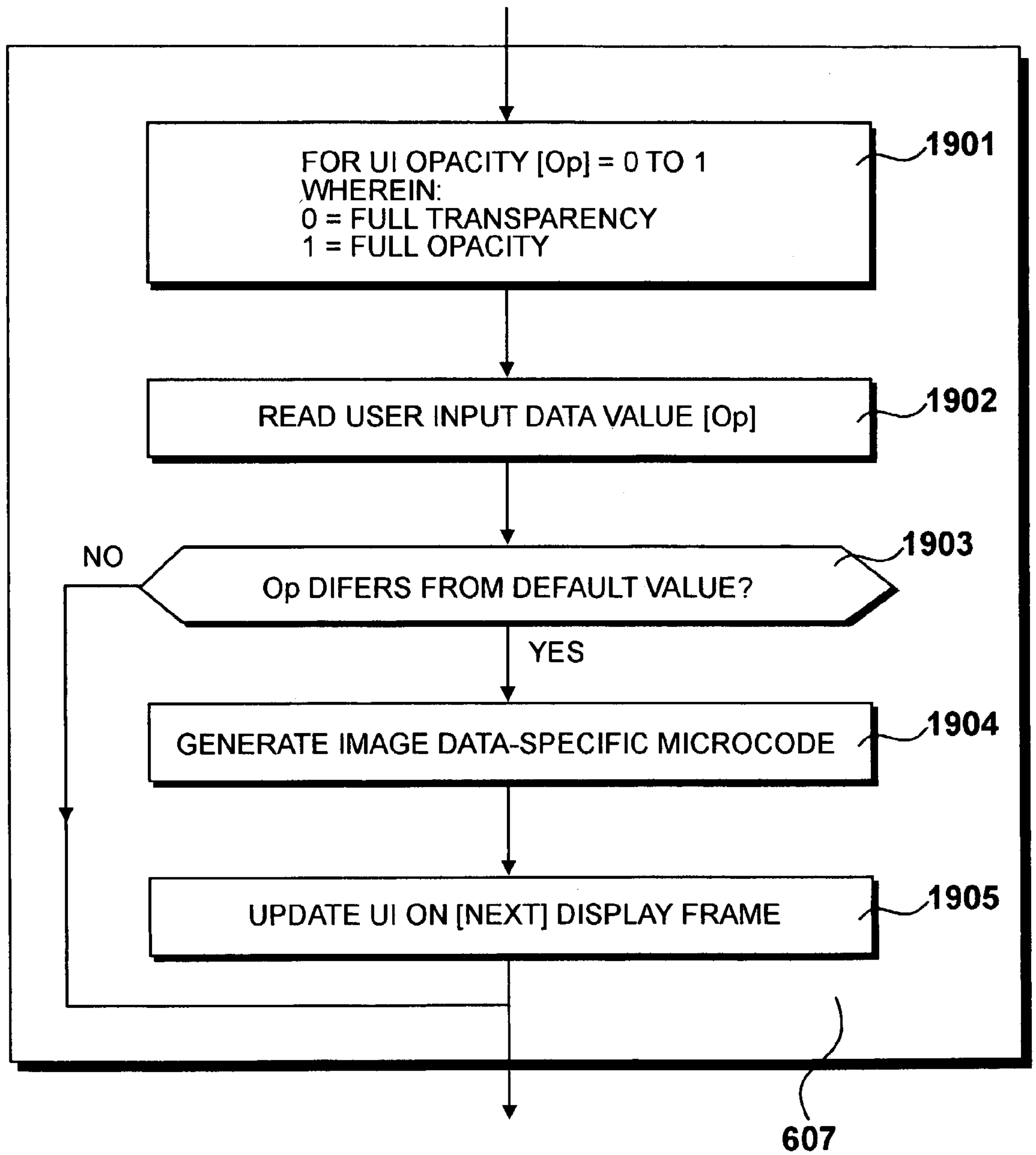
FIG. 19 further details the operational steps according to which the level opacity of the representations is generated according to user input.
Figure 21:
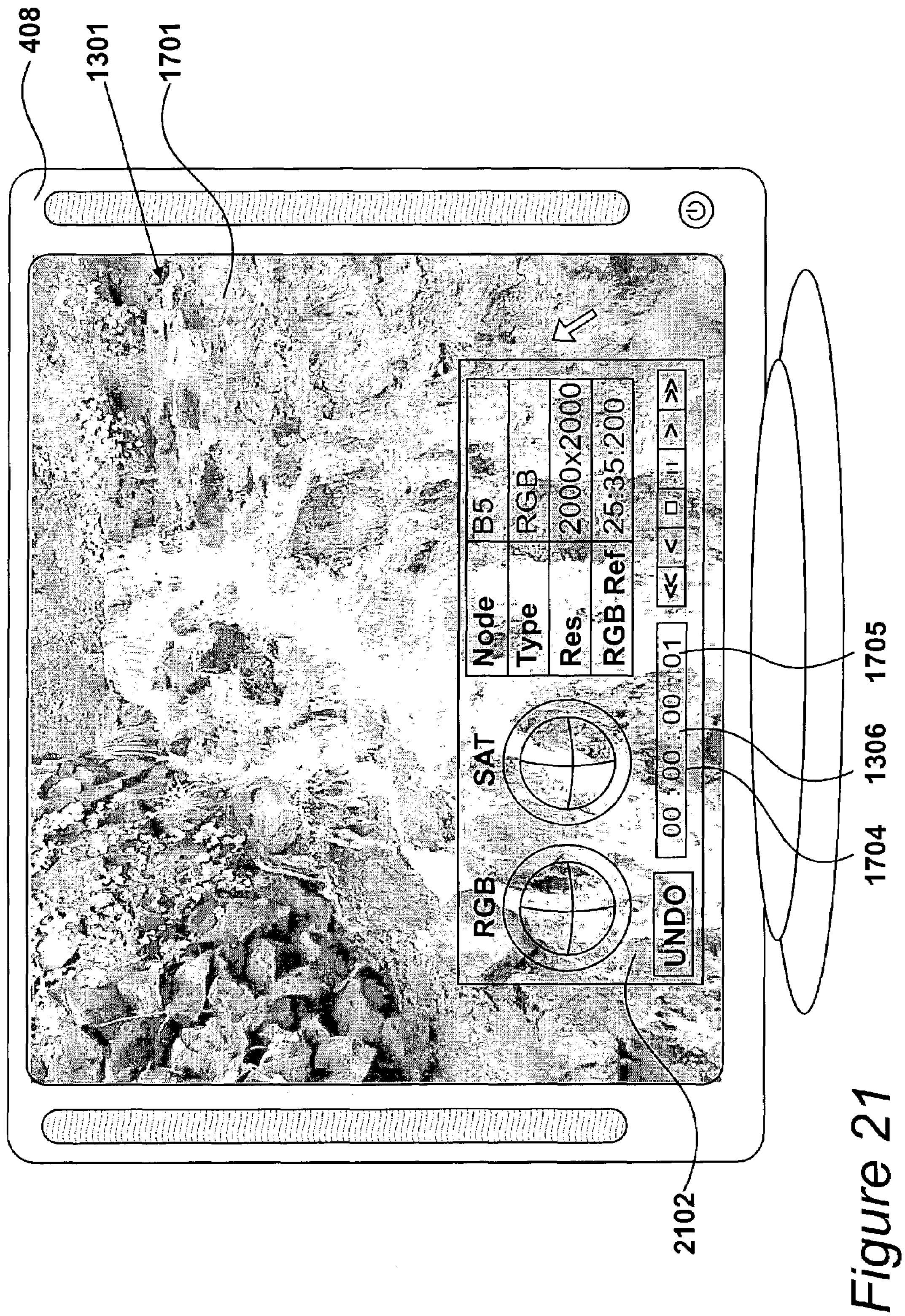
FIG. 21 shows the graphical user interface shown in FIG. 17 including representations blended with the image data according to first user input, as shown in FIG. 20.

The user interface 1301 shown in FIG. 17 is shown in FIG. 21, wherein user 407 has reconfigured the interface according to step 607, further detailed in FIG. 19, in order to configure the representation 1702 as fully transparent.

The frame image data 1701 remains unchanged in accordance with the above description, as do all of the "solid" (opaque) pixels defining the representation 1702 of the UI container object 1501, 1502. In the example, however, user 407 requires minimum interference from said representation 1702 with the entire image frame data 1701, whereby said user inputs a value of zero at step 1902 which represents a "full transparency" setting defined by condition 1901. All of the pixels of the UI container object 1501, 1502 to be blended into pixel 1703 are therefore processed according to step 2006 with an alpha channel component value of zero, whereby only the source pixels remain written at 1603 in frame buffer 1601. In the figure, fully transparent pixels 1703 are shown at 2101 and the representations 1302 to 1315 remain unchanged, representation 1306 for instance still having the same outline 1704 and alpha numerical data 1705 therein.

What is claimed is:

1. Apparatus Lot processing image data comprising storage means, processing means, manually operable input means and display means, wherein said storage means are configured to store said image data and instructions and said processing means are configured by said instructions to perform the steps of configuring at least one user-operable representation of at least one image data-processing function defined by said instructions with an adjustable opacity, wherein the user-operable representation is created and processed as a three-dimensional object;

adjusting said opacity of said representation in response to user input received from said manually operable input means;

blending said representation and said image data to generate blended image data; and outputting said blended image data to said display means.

2. Apparatus for processing image data according to claim 1, wherein said three-dimensional object comprises at least one polygon and at least one texture.

3. Apparatus for processing image data according to claim 2, wherein said configuring step further comprises the step of processing said user-operable representation and said image data into respective displayable pixels having an alpha channel value.

4. Apparatus for processing image data according to claim 3, wherein said opacity adjusting step further comprises the step of altering the value of said alpha channel attribute.

5. Apparatus for processing image data according to claim 3, wherein said blending step further comprises the step of alpha-blending said respective displayable pixels to generate said blended image data.

6. Apparatus for processing image data according to claim 1, wherein a plurality of user-operable representations of respective image data-processing functions defined by said instructions are configured with an adjustable opacity.

7. Apparatus for processing image data according to claim 6, wherein any of said image data-processing functions is a node within a hierarchical structure, whereby each of said nodes defines a representation of a respective image data-processing function.

8. Apparatus for processing image data according to claim 7, wherein said hierarchical structure is processed as a three-dimensional object comprising at least one polygon and at least one texture.

9. Apparatus for processing image data according to claim 8, wherein said configuring step further comprises the step of adding one or a plurality of image data-processing functions to said structure as respective nodes at runtime.

10. A method of processing image data with at least one image processing function comprising image data stored in storage means, processing means, manually operable input means and display means, wherein said method comprises the steps of configuring at least one user-operable representation of said image-processing function with an adjustable opacity, wherein the user-operable representation is created and processed as a three-dimensional object;

adjusting said opacity of said representation in response to user input received from said manually operable input means;

blending said representation and said image data to generate blended image data; and outputting said blended image data to said display means.

11. A method according to claim 10, wherein said three-dimensional object comprises at least one polygon and at least one texture.

12. A method according to claim 11, wherein said configuring step further comprises the step of processing said user-operable representation and said image data into respective displayable pixels having an alpha channel value.

13. A method according to claim 12, wherein said opacity adjusting step further comprises the step of altering the value of said alpha channel attribute.

14. A method according to claim 12, wherein said blending step further comprises the step of alpha-blending said respective displayable pixels to generate said blended image data.

15. A method according to claim 11, wherein a plurality of user-operable representations of respective image data-processing functions defined by said instructions are configured with an adjustable opacity.

16. A method according to claim 13, wherein any of said image data-processing functions is a node within a hierarchical structure, whereby each of said nodes defines a representation of a respective image data-processing function.

17. A method according to claim 16, wherein said hierarchical structure is processed as a three-dimensional object comprising at least one polygon and at least one texture.

18. A method according to claim 17, wherein said configuring step further comprises the step of adding one or a plurality of image data-processing functions to said structure as respective nodes at runtime.

19. A computer readable medium having computer readable instructions executable by a computer configured with memory means, manually operable input means and display means, such that said computer performs the steps of:

storing image data in storage means configuring at least one user-operable representation of at least one image-processing function defined by said instructions with an adjustable opacity, wherein the user-operable representation is created and processed as a three-dimensional object;

adjusting said opacity of said representation in response to user input received from manually operable input means;

blending said representation and said image data to generate blended image data; and outputting said blended image data to said display means.

20. A computer readable medium according to claim 19, wherein said three-dimensional object comprises at least one polygon and at least one texture.

21. A computer readable medium according to claim 20, wherein said configuring step further comprises the step of processing said user-operable representation and said image data into respective displayable pixels having an alpha channel value.

22. A computer readable medium according to claim 21, wherein said opacity adjusting step further comprises the step of altering the value of said alpha channel attribute.

23. A computer readable medium according to claim 21, wherein said blending step further comprises the step of alpha-blending said respective displayable pixels to generate said blended image data.

24. A computer readable medium according to claim 19, wherein a plurality of user-operable representations of respective image data-processing functions defined by said instructions are configured with an adjustable opacity.

25. A computer readable medium according to claim 24, wherein any of said image data-processing functions is a node within a hierarchical structure, whereby each of said nodes defines a representation of a respective image data-processing function.

26. A computer readable medium according to claim 25, wherein said hierarchical structure is processed as a three-dimensional object comprising at least one polygon and at least one texture.

27. A computer readable medium according to claim 26, wherein said configuring step further comprises the step of adding one or a plurality of image data-processing functions to said structure as respective nodes at runtime.

28. A computer system programmed to generate image data, comprising storage means, processing means, manually operable input means and display means, wherein said storage means are configured to store said image data and instructions, said instructions define operations to be performed in order to process said image data and instruct said programmed computer system to perform the steps of configuring at least one user-operable representation of at least one image-processing function defined by said instructions with an adjustable opacity, wherein the user-operable representation is created and processed as a three-dimensional object;

adjusting said opacity of said representation in response to user input received from said manually operable input means;

blending said representation and said image data to generate blended image data; and outputting said blended image data to said display means.

29. A system according to claim 28, wherein said three-dimensional object comprises at least one polygon and at least one texture.

30. A system according to claim 29, wherein said configuring step further comprises the step of processing said user-operable representation and said image data into respective displayable pixels having an alpha channel value.

31. A system according to claim 30, wherein said opacity adjusting step further comprises the step of altering the value of said alpha channel attribute.

32. A system according to claim 30, wherein said blending step farther comprises the step of alpha-blending said respective displayable pixels to generate said blended image data.

33. A system according to claim 28, wherein a plurality of user-operable representations of respective image data-processing functions defined by said instructions are configured with an adjustable opacity.

* * * * *